US012041031B2

(12) United States Patent
LaChance et al.

(10) Patent No.: US 12,041,031 B2
(45) Date of Patent: Jul. 16, 2024

(54) SCALABLE SECURITY FOR SaaS DATA LAKES

(71) Applicant: Cazena, Inc., Waltham, MA (US)

(72) Inventors: Brian LaChance, Hudson, NH (US); Lisa Bielefeld, Arlington, MA (US); John Piekos, Westford, MA (US)

(73) Assignee: Cazena, Inc., Waltham, MA (US)

( * ) Notice: Subject to any disclaimer, the term of this patent is extended or adjusted under 35 U.S.C. 154(b) by 0 days.

(21) Appl. No.: 17/392,802

(22) Filed: Aug. 3, 2021

(65) Prior Publication Data

US 2022/0103518 A1    Mar. 31, 2022

Related U.S. Application Data

(60) Provisional application No. 63/060,475, filed on Aug. 3, 2020.

(51) Int. Cl.
| | |
|---|---|
| *H04L 9/40* | (2022.01) |
| *G06F 11/20* | (2006.01) |
| *G06F 11/30* | (2006.01) |
| *H04L 61/2503* | (2022.01) |

(52) U.S. Cl.
CPC ...... *H04L 63/0218* (2013.01); *G06F 11/2025* (2013.01); *G06F 11/301* (2013.01); *H04L 61/2503* (2013.01); *H04L 63/0236* (2013.01); *H04L 63/0263* (2013.01);
(Continued)

(58) Field of Classification Search
CPC ............. H04L 63/0218; H04L 61/2503; H04L 63/0236; H04L 63/0263; H04L 63/029; H04L 63/0435; H04L 63/20; G06F 11/2025; G06F 11/301; G06F 21/6218
See application file for complete search history.

(56) References Cited

U.S. PATENT DOCUMENTS

| | | | |
|---|---|---|---|
| 10,484,334 B1* | 11/2019 | Lee | .......................... H04L 67/30 |
| 10,659,523 B1 | 5/2020 | Joseph et al. | |
| 10,911,407 B1* | 2/2021 | Warburton | .......... H04L 63/0245 |

(Continued)

FOREIGN PATENT DOCUMENTS

WO    2013-016584 A1    1/2013

OTHER PUBLICATIONS

International Search Report and Written Opinion, PCT/US2021/044328, dated Nov. 29, 2021.

*Primary Examiner* — J. Brant Murphy
(74) *Attorney, Agent, or Firm* — David H. Judson

(57) ABSTRACT

A method and scalable security service is implemented by a service provider in association with a set of cloud computing services. The method begins by the service provider provisioning a plurality of data lakes across one or more cloud computing services. A data lake is provisioned within a private data cloud of the one or more cloud computing services. To provide scalable security, the service provider configures a virtual firewall in each of two or more regions of the one or more cloud computing services. In particular, the firewall in a given region is associated with a subset of the plurality of data lakes, and wherein the subset comprises at least first and second data lakes associated to at least first and second distinct external enterprise networks. Using the virtual firewall, the service provider then enforces security requirements associated with the subset of the plurality of data lakes via the virtual firewall.

18 Claims, 20 Drawing Sheets

(52) U.S. Cl.
CPC ........ *H04L 63/029* (2013.01); *H04L 63/0435* (2013.01); *H04L 63/20* (2013.01)

(56) References Cited

U.S. PATENT DOCUMENTS

| | | | | |
|---|---|---|---|---|
| 2016/0218991 | A1* | 7/2016 | Sharabi | G06F 9/45558 |
| 2018/0006913 | A1* | 1/2018 | Asenjo | H04L 41/0856 |
| 2018/0145879 | A1* | 5/2018 | Cook | H04L 12/4641 |
| 2019/0207812 | A1 | 7/2019 | Li et al. | |
| 2019/0286832 | A1* | 9/2019 | Szeto | H04W 12/082 |
| 2019/0319859 | A1* | 10/2019 | Casey | H04L 63/1408 |
| 2019/0362278 | A1* | 11/2019 | Saraf | G06Q 10/0635 |
| 2020/0007569 | A1* | 1/2020 | Dodge | H04L 41/0866 |
| 2020/0099661 | A1 | 3/2020 | Duval et al. | |
| 2021/0089278 | A1* | 3/2021 | Dunn | G05B 19/05 |
| 2022/0045987 | A1* | 2/2022 | Warburton | H04L 63/20 |
| 2022/0141254 | A1* | 5/2022 | Oswal | H04L 63/0263 726/1 |
| 2022/0247785 | A1* | 8/2022 | Ly | H04L 63/0245 |

\* cited by examiner

SCALABLE SECURITY FOR SaaS DATA LAKES

BACKGROUND OF THE INVENTION

Technical Field

This disclosure relates generally to security services in a cloud computing environment.

Background of the Related Art

A data lake is a system or repository of data stored in its natural/raw format, typically a single store of data including raw copies of source data, as well as transformed data. used for tasks such as reporting, visualization, advanced analytics and machine learning. A data lake can include structured data from relational databases (rows and columns), semi-structured data (CSV, logs. XML. JSON), unstructured data (emails, documents. PDFs) and binary data (images, audio, video). A data lake can be established "on premises" (within an organization's data centers) or "in the cloud" (using cloud services from vendors such as Amazon®, Microsoft®, or Google®). Creating a data lake requires several tasks: acquire and deploy infrastructure, physical hardware, set up and configure compute, storage and networking, as well as big data compute engines, security and management tooling. This is a very time-consuming process, often taking a team six-to-nine (6-9) months to build a production-ready, fully-secure environment. Creating data lakes in a cloud computing environment eliminates the hurdle of buying physical hardware, but it still requires significant work sizing, configuring and deploying fully secure data lakes in a timely manner.

Techniques and services that automate SaaS (Software-as-a-Service) Orchestration for cloud data lakes can automatically provision secure infrastructure in cloud environments, thereby overcoming many of the deficiencies of the above-described art. While such technologies enable a service provider to provide for production-ready data lakes to be immediately accessible upon provisioning, there remains a need to ensure that customer data lakes remain highly-available and secure across the cloud environments associated with the service provider.

BRIEF SUMMARY

The scalable security approach herein is implemented in association with an architecture and platform to automatically provision secure infrastructure in any cloud with an embedded PaaS (Platform-as-a-Service) stack containing third-party or cloud-native data processing engines. For example, a service provider that runs an architecture of this type provisions a data lake in Amazon® AWS or Microsoft® Azure. To this end, a logically-isolated virtual network is associated with the service provider's deployment account or a customer account, as the case may be. The logically-isolated virtual network is sometimes referred to herein as a "private data cloud" (PDC) or "virtual private cloud" (VPC) because preferably it is single tenant-based and is not visible (accessible) via the public-routed Internet. Typically, the PDC is uniquely associated with a specific, or individual data lake. A firewall service enabling secure access between the data lake and an external enterprise network is also provisioned. The data lake is then provisioned in the private data cloud to complete the rapid deployment.

According to this disclosure, the service provider has associated therewith a highly available architecture to deliver a managed end-to-end secure SaaS data lake platform connecting logically-isolated cloud virtual networks to centralized virtual cloud firewalls, preferably in a hub-spoke design. This solution facilitates secure encrypted traffic between a customer's on-premises network to the customer-specific managed data lake, and the services platform provides a stack for analytics capabilities and 24×7 operations and monitoring. Preferably, centralized firewalls provide independent ingress gateways and security policy rulesets for each customer to access their data lake environment, while traffic is kept separate from other customers.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION

Figure 1:
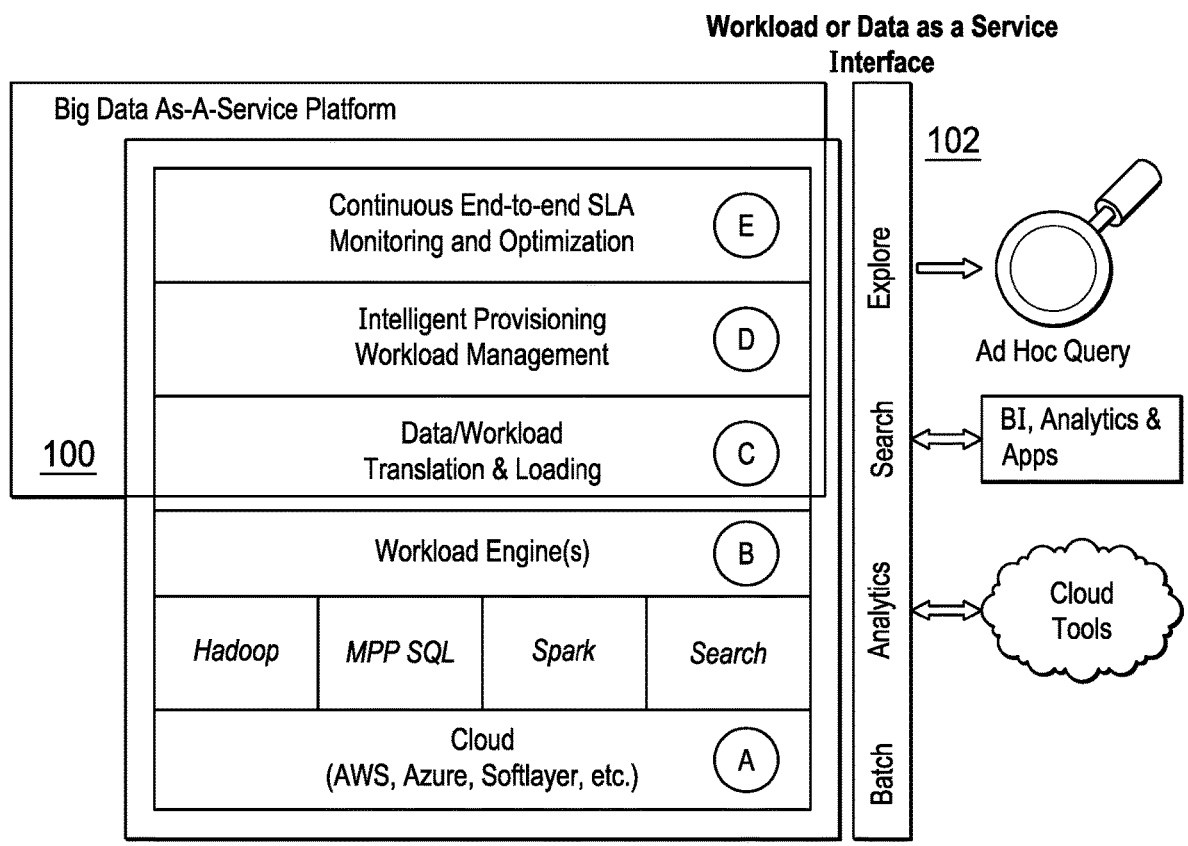
FIG. 1 depicts an exemplary block diagram of a known distributed data processing environment in which exemplary aspects of the illustrative embodiments may be implemented.

The techniques herein are implemented from a network-accessible platform, which platform operates in association with, on the one hand, an enterprise analytics data infrastructure, and, on the other hand, a cloud computing infrastructure. A "customer" or "user" of the platform typically is an enterprise that desires to execute an analytics application "workload" against a set of enterprise data. Typically, the enterprise data comprises one or more data sources, and the notion of "enterprise data" is not necessarily limited to data that is actually sourced from the enterprise. The service platform of this disclosure acts as an intermediary between the enterprise analytics data infrastructure (which, typically, is "on-premises") and the underlying cloud compute resources that are to be provisioned and utilized by the enterprise for executing the workload. Typically, a "workload" as used herein refers to the operations that are performed by the analytics applications with respect to the enterprise data. According to this disclosure, that "workload" gets executed in the "cloud," but in a seamless and efficient manner. In this way, both the enterprise data itself and the analytics operations on that data are off-loaded to the cloud, but in a manner that provides the enterprise customer with only the amount of "resources" needed for the workload, and in a reliable and cost-effective manner.

By way of background, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

Typically, a cloud computing infrastructure may comprise co-located hardware and software resources, or resources that are physically, logically, virtually and/or geographically distinct. Communication networks used to communicate to and from the platform services may be packet-based, non-packet based, and secure or non-secure, or some combination thereof.

The services platform described may itself be part of the cloud compute infrastructure, or it may operate as a stand-alone service that executes in association with third party cloud compute services, such as Amazon® AWS, Microsoft® Azure, IBM® SoftLayer®, and others.

Typically, the enterprise analytics infrastructure is a standard analytic stack data flow comprising one or more data warehouses or data marts, ETL processes, workload engines (e.g., databases such as Hadoop, MPP SQL, Search or Spark), and analytics applications, such as business intelligence tools, advanced analytics tools, and the like. As is well known, a data warehouse, sometimes referred to an enterprise data warehouse (EDW), is a system used for reporting and data analysis. Data warehouses are central repositories of integrated data from one or more disparate sources. Typically, they store current and historical data. A data mart is a type of data warehouse that is focused on a single subject or functional area. Data marts usually draw data from only a few sources, such as internal operational systems, a central data warehouse, or external data. An extract-transform-load (ETL) process provides staging, data integration, and access layers. The staging layer stores raw data extracted from each of the disparate source data systems. The integration layer integrates the disparate data sets by transforming the data from the staging layer. The integrated data are then moved to the data warehouse database, where the data is arranged, typically into hierarchical groups. The access layer helps users retrieve data. The particular details of the enterprise data analytics layer are not a limitation of this disclosure, as the services platform is designed to operate with any type of components that may comprise the enterprise data analytics environment.

In particular, and as will be described, multiple enterprise customers use the services platform to offload data analytics workloads to "data clouds" that are intelligently provisioned and managed by the services platform. Each customer's workload may be executed in the cloud securely and privately, and in a manner that, for a given customer, meets a service level objective and cost.

By way of additional background, FIG. 1 illustrates how a services platform 100 functions as an intermediary between the enterprise and the cloud compute infrastructure. As seen in FIG. 1, layer A represents that underlying cloud compute resources on which the data analytics application commands are executed against one or more workload engines, which are represented as layer B. The compute cloud and the workload engines are not necessarily part of the services platform but they are accessible thereby. The services platform 100 typically comprises Layers C, D and E.

Layer D (Intelligent Provisioning/Workload Management) provides the basic resource provisioning of the underlying compute cloud infrastructure, which includes the "data warehouse environment" including storage, compute nodes, networking, as well as the specific workload engine (a database, for example, a Hadoop distribution with specific configuration), which often is available from the cloud provider. As used herein, a workload engine refers to a database or data processing engine, such as (without limitation) those based on SQL, Hadoop, NoSQL, and others. Preferably, provisioning is done based on static information provided by the enterprise, or based on a "profiler" that profiles a specific workload and derives "optimal" provisioning based on cost, utilization and SLA requirements for the unique characteristics of the workload. This type of optimal provisioning ensures adequate workload performance at the lowest cost cloud footprint. As will be described, the resource provisioning is instantiated from a simple user interface console using a small set of basic inputs.

In general, the provisioning layer optimally provisions resources in the cloud by matching workload resource requirements to resource bundling options available in the cloud. To this end, the layer includes a workload profiler that accepts historical workload information comprising, for example, a plurality of database log files, application log files, and query system views, along with actual and projected workloads. It uses this information to produce a description of the workload resource requirements. A provisioning optimizer accepts the profiled workload resource requirements, along with service level agreements and cost requirements, and descriptions of the resource bundling options available in the cloud, and calculates the optimal cloud provisioning. This optimal cloud provisioning typically is a subset of the available cloud compute resources, and it may include an identification of one or more workload engines (e.g., databases) that will store the data and against which a workload (a set of commands from an analytics application, a set of search queries, etc.) will be executed.

In one embodiment, the historical log files and databases comprise descriptions of specific database queries, such descriptions comprising an identifier and text of a database query, the time the query was submitted and the time it completed, an execution plan for the query comprising a number of database operations, the estimated and actual costs and resources required for each database operation in the execution plan. The historical log files and databases may also comprise aggregated information about queries submitted over a period of time, such aggregated information comprising the number and total amount of time and total resources used by all queries over the period of time, grouped by type of resource and by database operation. By way of example, this aggregated information may indicate the total number of sequential disk scan operations across all queries over a period of time, along with the total number of bytes scanned, and the total time required to do the scanning.

In one embodiment, the service level agreements comprise a plurality of performance specifications. A performance specification may indicate a scheduling requirement as the time at which a particular workload is to complete. A performance specification may indicate a latency requirement as a percentage of cases in which a workload is to complete within a given amount of time after it is submitted. A performance specification may indicate a throughput requirement as the number and type of workloads to be completed within a period of time. With each specification in the service level agreements, there is a cost associated with failure to satisfy the condition. These costs may be arbitrary functions of both the size and the duration of the failure.

In one embodiment, the resource bundling options available in the cloud are derived by accessing public APIs provided by commercial cloud vendors and stored in database tables, whose columns indicate a cloud vendor, a locale, a resource-bundling-name, and a description of the types and amounts of resources provided in the bundling option. Said resources comprise compute resources, memory resources, disk resources and network resources. Said compute resources comprise number of cores, cycle time (GHz) and operations per second, processor type and instruction set (such as GPU/CUDA or CPU/ix86 or FPU). Said memory resources comprise memory level (L1 cache, L2 cache, L3 cache, general memory), # bytes-per-level, time to move data from memory level to processing unit. Said disk resources include type (SSD, magnetic disk), capacity in byte, read seek time, write seek time, # bytes/sec for reads and writes, IOPS. Said network resources comprise network type, # bytes/sec.

In one embodiment, the optimal cloud provisioning comprises a list of available provisioning options, ordered from best to worst, where each option comprises a workload description, a cloud provider, cloud locale, a number and type of virtual computational nodes, and a number and type of storage options. The term "optimal" is not intended to be limiting. The workload description comprises any or all of the workloads. The cloud provider may be a commercial vendor or a private on-premises cloud. The cloud locale describes the geographical region in which the cloud is to be provisioned. The type of virtual computational is a specific bundling of computational resources; and a storage option is a specific bundling of storage capacity and performance. In an embodiment supporting elasticity, the provisioning options further comprise range information describing the minimum, maximum and average number of virtual computational nodes of given types, along with the standard deviation. Layer E (Continuous SLA Monitoring and Optimization) ensures that the cloud compute resources are optimized, for example, based on an actual delivery of an SLA and cost over a certain period of time. This layer includes functionality that computes the utilization and SLA for workloads, for example, over daily, weekly, monthly windows. Based on one or more rule-based triggers, the optimization layer can alert or create reports if there is persistent under-allocation or over-allocation of resources. When this happens, Layer E can allocate a specific "re-provisioning time window," where the system resources are dynamically altered. Alteration as used herein may refer to an increase or decrease in the number of nodes provisioned based on the observed rules, altering specific "type" of nodes to increase or decrease performance based on specific I/O, compute or memory characteristics, altering the specific location of the processing (regions) to reduce latency and contention, or shifting the workload to an alternative cloud provider (e.g., if there is a persistent issue tied to the current provider).

Layer C (Data Translation and Loading) ensures that the enterprise data is loaded in an optimal way into the right workload engine environment. The "loading" function typically is carried out by one or more "data movers" that are integrated into the enterprise environment or that work in conjunction therewith. In some cases, the enterprise data may need to go through translation (such as schema translation, conversion of keys, compression, and so forth) to the right environment. For example, moving data from SMP databases to MPP databases require steps in terms of schema mapping, sort and distribution keys. This layer takes care of the specific issues involved in moving data sources to targets (the workload engines themselves).

Access to the services platform 100 may be provided via a services interface 102 through which enterprise users may perform queries, execute workloads (typically search queries instituted from Business Intelligence tools, Advanced Analytics applications, etc.), and the like. The service interface 102 may be implemented as a manual CLI or GUI-based interface, an application programming interface (API), or some other such mechanism.

Figure 2:
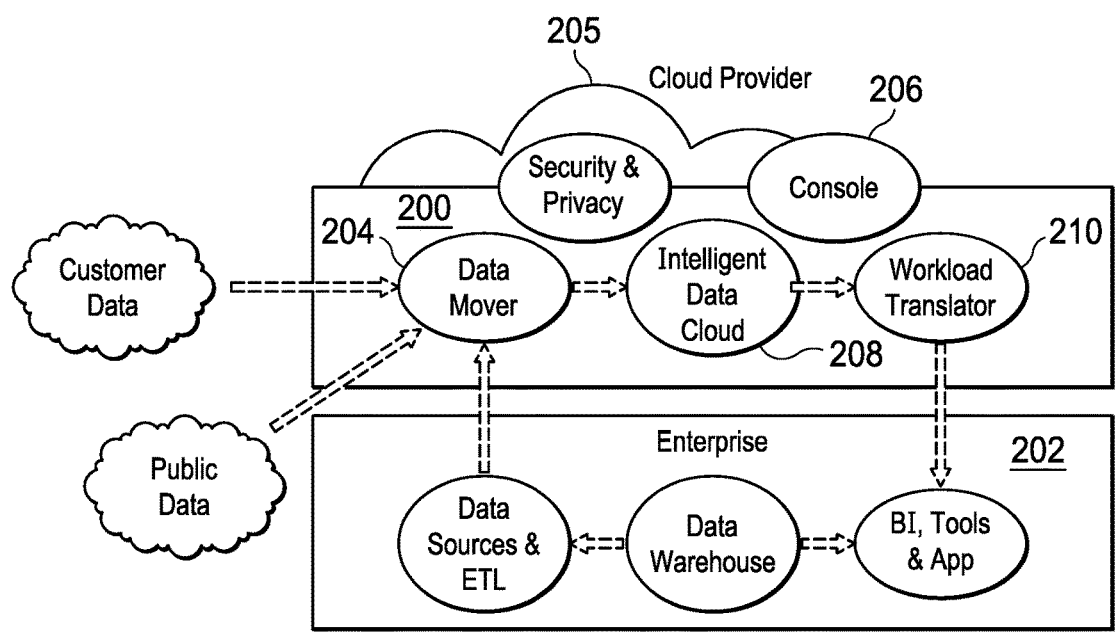
FIG. 2 illustrates how the services platform of this disclosure provides an overlay on an enterprise data analytics layer.

FIG. 2 illustrates the services platform 200 of FIG. 1 positioned as an "overlay" on the enterprise data analytics infrastructure 202. As noted, the enterprise analytic stack data flow includes the ETL, data warehousing, EDW, and BI/advanced analytic tools. The enterprise infrastructure also may comprise log and unstructured data aggregation, Hadoop processing, other analytic processing tools, and the like. Block 202 shows one specific cloud provider and its cloud offerings (such as compute nodes, storage nodes, and the like). The service platform, as noted, is architected to support multiple cloud providers, only one of which is shown in FIG. 2.

As noted, the service includes a number of functional modules. The data mover functionality 204 provides automated life-cycle management of the enterprise data that needs to be exported to the services platform. As will be described, this functionality provides a flexible data collection tool (or tool set) that aggregates structured and unstructured data from a number of different enterprise data sources including, without limitation, ETL servers, files, logs, or databases or data warehouses. Data is collected based on specific rules and filters so that only required subset of data is collected. Preferably, a data mover component can incorporate data from existing collection agents such as flume or fluentd, or via other log ingest mechanisms. The data mover functionality may be implemented in software, in hardware-based appliance, in specialized server machines, or the like. Aggregated data either is moved to the cloud directly, or it can be staged (e.g., on a staging server/appliance) and then scheduled for delivery at the most efficient and optimal times. Preferably, a data mover provides one or more transformations, such as data compression, and data encryption. In particular, preferably all data that is collected is compressed using a variety of techniques best suited to the type of data. Preferably, the data is encrypted with standard enterprise-class standards. Optionally, the service provides a full end-to-end encrypted tunnel for support of analytics on encrypted data. Preferably, the enterprise data is moved into the cloud (and, in particular, into the workload engine(s)) via a specialized delivery protocol that ensures reliability and high-performance of delivery. A particular data mover may also leverage third party mechanisms, such as AWS Direct Connect, or any other delivery protocol that the cloud providers offer to the enterprises. Generally, and as described, a particular data mover supports streaming, scheduled or one-time data movement. In a preferred embodiment, and as will be described, a data mover is built to layer on top of existing cloud provider offerings (such as AWS S3 and others) so that it provides seamless big data movement with a few clicks. A particular data mover is instantiated and orchestrated by a user console 206.

The console 206 is a configuration tool or portal for the service. In one embodiment, the console is a display interface configured as a web-accessible tool, such as a set of TLS/SSL-secured web pages. A customer registers to use the service, and permitted users associated with the enterprise customer receive access credentials. Users may be authenticated and authorized to use the interface in any known manner. The console 206 provides the user experience, management and policy capabilities for the overall platform. The console 206 also exposes administration interfaces by which the service provider creates a customer account and instantiate a specific platform for the customer. This may involve the orchestration of a private cloud for the customer within the third party cloud compute infrastructure. Once the customer account is established, permitted users associated with the enterprise access and use the service. To this end, a given analytics application workload is processed using a simple user interface by which the user designates a simple data set, such as type of data to be moved, volume of data, type of workload engine, information about the analytic application, information regarding required SLA, or cost, etc. The enterprise customer preferably identifies the size of the workload using a simple and small set of generic categories (e.g., "small," "medium" or "large"), and identifies the enterprise data that will be subjected to the workload. The information provided by the user also indicates the one or more data sources from which the data will be obtained, as well as the "type" of the workload engine (e.g., Hadoop, MPP SQL, etc.). Based on this simple data set, the data cloud 208 (or "cluster") is created and made available to the enterprise user for workload processing.

In particular, the data cloud is instantiated based on the information captured by the console. As noted above, preferably the data cloud comprises the underlying cloud compute layer 202 (that does not get exposed to the user), as well as support for the workload engines (Layers A and B in FIG. 1). As noted above, preferably the provisioning of the data cloud 208 is done based on static information provided by the enterprise, or based on a "profiler" that profiles a specific workload and derives "optimal" provisioning based on cost, utilization and SLA requirements for the unique characteristics of the workload. The provisioning ensures adequate workload performance at a lowest cost cloud footprint.

The profiler and the resource-provisioning functionality greatly simplify the user experience and interface between the enterprise and the cloud. In the past, the end user interacted with the cloud directly and had to manually pick piece parts, such as type of nodes, number of nodes, specific type of database distribution, etc., often without a good understanding of how such selections impacted the overall performance. The provisioning capability in the platform simplifies the user interface for enterprises. Using the interface, the end user identifies a given service level (e.g., the processing of the workload needs to be processed "within X time") at a particular cost (e.g., $Y dollars per unit time). Based on these simple high level inputs and the other information in the user-configured data set, a profiler and resource provisioning function (FIG. 1, Layer D) optimally provisions the underlying cloud compute infrastructure without involving enterprise personnel into technical details. This provisioning typically is in the form of instructions that are provided by the platform to the underlying cloud compute infrastructure.

As also seen in FIG. 2, the services platform may provide a workload translator 210 to ensure that existing analytic tools (e.g., such as Business Intelligence, Advanced Analytics, etc.) that are deployed in the enterprise work seamlessly with the services platform. With the workload translator 210 in place, typically, such tools are just re-targeted to point to the services platform and do not need to be modified. A security and privacy layer 212 is operative to ensure that enterprise security and privacy policies are extended to the service platform. Preferably, the platform provides network and user-level AAA (access control, authentication, and authorization). Preferably, access control is role-based and extended from the enterprise directory, such as Active Directory or LDAP. Preferably, additional role segregation is supported. As previously noted, data security is provided via encryption of data, preferably during transit and at rest. Optional features include the ability of the enterprise to control and manage the keys independent of the cloud provider or the service platform administrators. The security and privacy layer also provides for secure logging, auditing and monitoring, including alerting on any system or data-level incident. The platform may also provide compliance reporting that allows enterprises to extend their compliance posture to the cloud environment.

With the above as background, the techniques of this disclosure are now described.

Cloud Data Lake Platform and SaaS Orchestration

Figure 3:
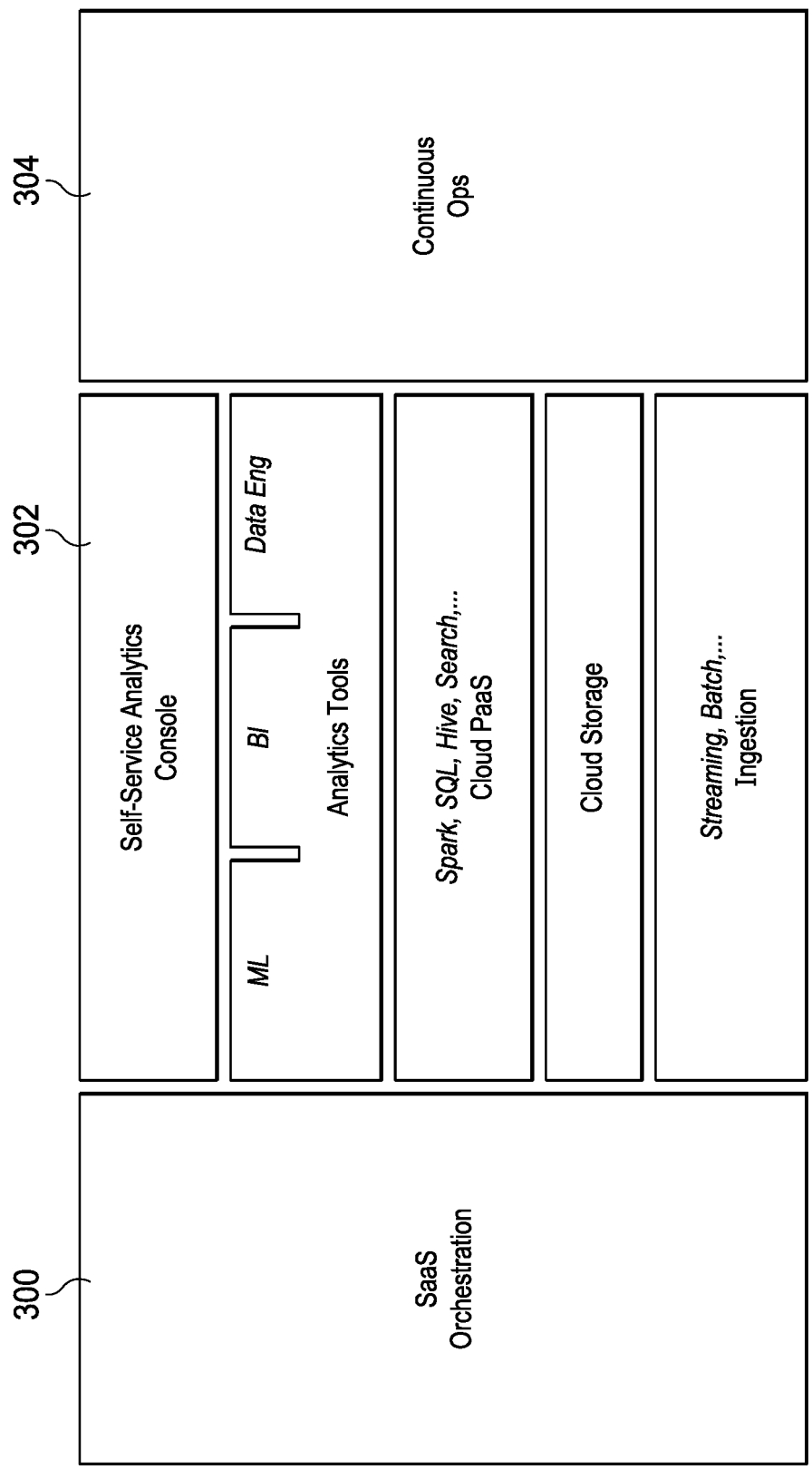
FIG. 3 depicts an implementation of a data lake provisioning and operations platform according to this disclosure.

As depicted in FIG. 3, the approach herein is implemented preferably using three (3) automated capabilities: SaaS Orchestration 300, which provides automated provisioning of a complete production cloud data lake; Self-Service Analytics 302, which provides for a simplified SaaS-based console that enables analysts and data scientists to instantly run analytics in the data lake using popular tools; and Continuous Ops 304, which provides ongoing operations for workloads, cost, security, and SLAs (service level agreements). Although the components 300, 302 and 304 are shown as distinct, this is not a requirement. These components may be integrated in whole or in part. The platform typically embeds (or has access to) a variety of best-of-breed or cloud-native PaaS, IaaS, and analytical tools, providing enterprises with maximum flexibility of price/performance and ease of use.

SaaS Orchestration

Data lakes require different cloud stack capabilities to be integrated, configured and optimized together for a production cloud data environment. According to this disclosure, the platform and method herein provide SaaS Orchestration around five (5) distinct capabilities to deliver a production-ready data lake; these capabilities include SaaS provisioning, identity management, security and privatization, hybrid deployment, and data governance and compliance. Together, these capabilities comprise a configured "data lake" according to this disclosure. Each of these capabilities is now described.

SaaS Provisioning: The platform unifies infrastructure, network, and security capabilities in a single "SaaS-as-code" instance, including (for example): data ingestion, cloud account and resources, cloud-to-enterprise virtual private networking, security perimeter, firewalls and encryption controls, storage management (object/attached/archival storage, such as S3/ADLS/ . . . ), PaaS data processing engines (such as SQL, Spark, Hive, NoSQL, etc.), and cloud infrastructure for analytical tools. According to an aspect of this disclosure, production-ready data lakes are accessible for analytics as soon as they are provisioned, and data lakes as provided for herein are provisioned with optimal "shapes" that deliver maximum performance, preferably within a user-defined cost threshold.

Identity Management: The platform also integrates disparate PaaS, cloud, and tools identities, thereby addressing a known friction point for enterprises deploying cloud data lakes. The SaaS data platform solution automates a uniform authentication and authorization mechanism across analytic tools, PaaS data processing engines, and the cloud storage resources, so that enterprise identities can be seamlessly managed with the data lake.

Security and Privatization: The SaaS data platform also automates the security policies around the data lake so that all external access is blocked with an enterprise firewall, allowing access only from specific private endpoints in the enterprise. This level of isolation makes the data lake a "private single tenant" data environment for each customer in the cloud datacenter of their choosing.

Hybrid and Multi-Cloud Deployment: Preferably, data lakes as provisioned according to this disclosure are "wired" to the enterprises with an intelligent hybrid architecture to ensure that on-premises data users and administrators all get easy access. To this end, the data lake looks like a seamless extension of the enterprise network, while it has complete security isolation at a physical level.

Data Governance and Compliance: The SaaS data platform preferably also configures auditing, discovery, and cataloging to ensure that all data access within the data lake is logged and the provenance is maintained. Preferably, data access is made visible to administrators; additionally, preferably historical system and data access activity is also centralized for compliance reporting. The SaaS data platform offers preferably offers industry-standard compliance certifications, such as SOC II-Type 2.

The following provides additional technical details regarding an implementation of the above-described platform and orchestration implementation.

In one embodiment, the SaaS-based orchestrator 300 is specifically implemented using Terraform, which is a tool for building, changing, and versioning infrastructure safely and efficiently. Terraform, which is available as an open source tool, allows the system to define numerous modules and relationships between them, thereby creating infrastructure-as-code. Preferably, each Terraform module relies on one or more "providers" to implement the underlying resources. Preferably, existing providers are extended with one or more custom providers plus custom Python, Groovy, Java, and shell script to create the turnkey service of this disclosure.

Terraform allows definition of phases of deployment, and it treats each phase as an idempotent and dynamic stack. Once the code for the data lake being provisioned is created, the Terraform infrastructure dynamically generates module dependencies based on defined system rules, creates a resource map of what exists and what needs provisioning, and then drives towards a complete and successful deployment. A typical deployment results in a large number of resources under management, all of which typically have a complex web of interdependencies that the platform then manages for the customer. Preferably, the state of these resources is captured and securely stored for future system upgrades and expansion. The Terraform solution allows the system more surgical control over changes to the deployment, e.g., to cope with dynamic workloads, upgrades, and expansion.

As an example, the following describes one specific process and implementation of the SaaS data platform and SaaS orchestration. For this implementation, it is assumed that the data lake resides within a private cloud environment (for illustration, referred to by AWS as a Virtual Private Cloud) within a Cloud provider such as AWS or Azure. This is not a limitation, however. For this example, the following steps are then carried out via automation:

Creation of a Customer-Specific Cloud Account

Because this is a private cloud environment, preferably the first step that occurs is to create a private cloud account for the deployment. A private account defines a logical boundary around the resources provisioned such that they can only be used by entities that have access to that account. Typically, there is one cloud account per platform customer. This is known as a single-tenant environment, meaning that customers do not share cloud accounts.

Creation of a Private Cloud Environment to Hold a Single Customer's Data Lake

Figure 4:
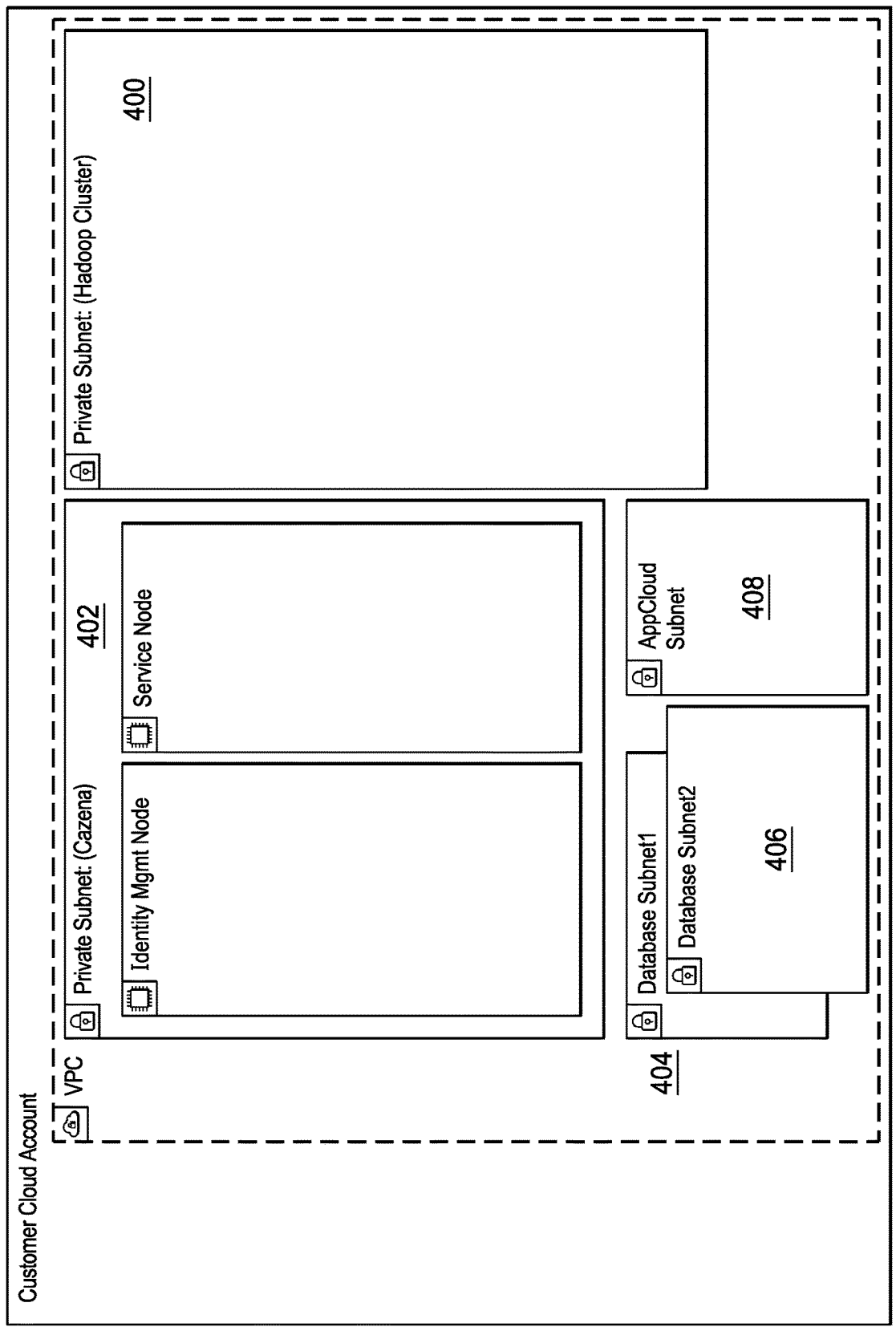
FIG. 4 depicts a representative subnet architecture of the platform.

Within the private cloud environment, the SaaS data lake preferably is provisioned across a plurality (preferably five (5)) private subnets. This configuration is depicted in FIG. 4. One subnet 400 is for the data lake engine, such as Cloudera CDH/CDP or AWS EMR. A second subnet 402 preferably contains provider services such as monitoring and alerting, orchestration (lifecycle management), identity management and a user-visible portal through which the provider services are accessed and managed by the user. The third and fourth subnets 404, 406 preferably comprise a database replica pair to hold persistent state for the data lake users. The fifth 408 and last subnet preferably holds a cloud application infrastructure (e.g. AppCloud and AppCloud applications). Once these subnets are created, the next step is to fill them to create compute services, and to fill out the data lake.

Provisioning and Configuration of Service Nodes

Figure 5:
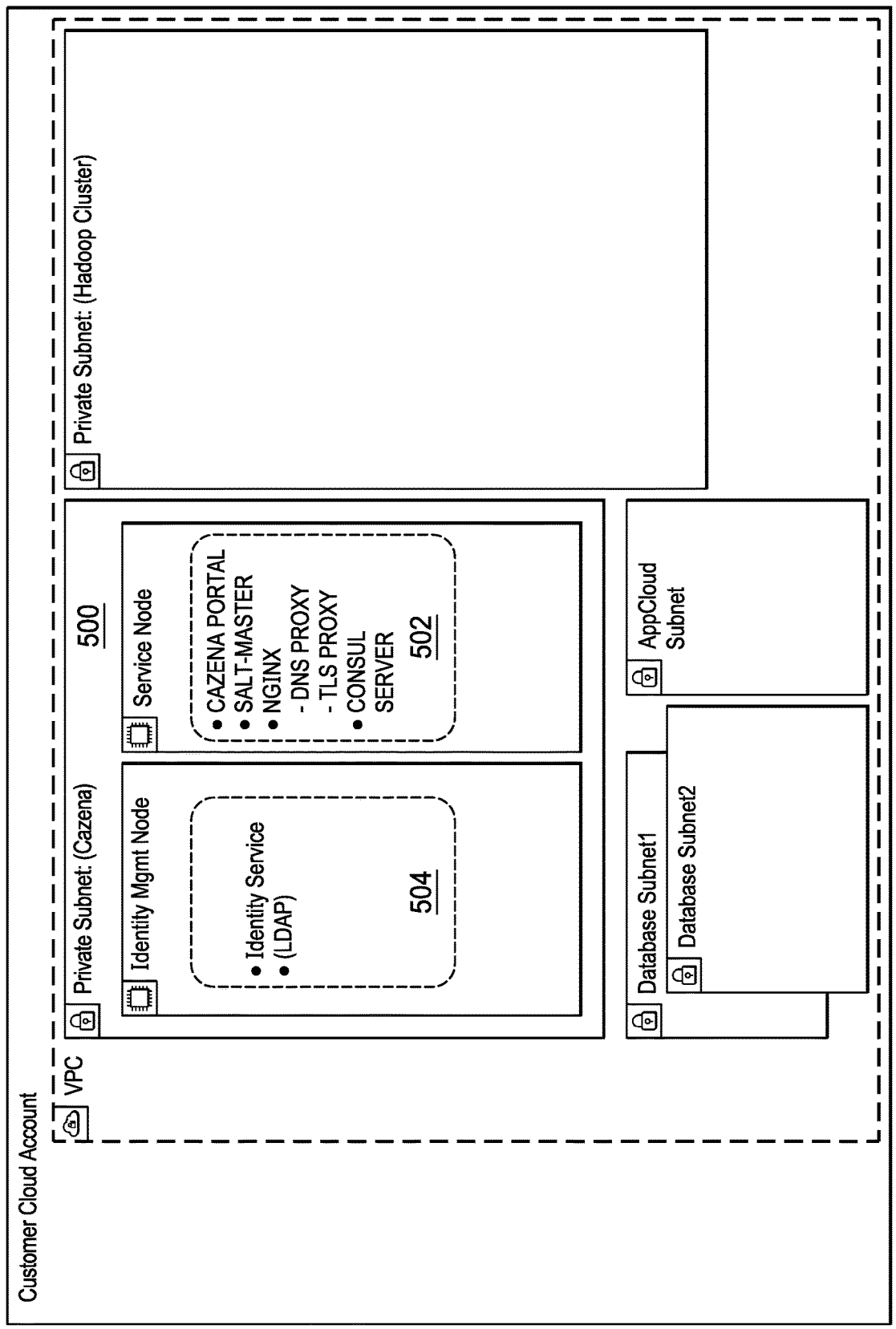
FIG. 5 depicts the provisioning of the service node subnet.

With reference now to FIG. 5, within the Provider Services subnet 500, the Service Node 502 is first provisioned and deployed. The Service Node hosts orchestration services, user console, service registry, and a configuration management server. DNS entries are then configured for the console, service registry, service node, and configuration management server. Within the Provider Services subnet 500, an Identity Management Node 504 is provisioned and deployed to host Identity Management and Authorization services. As noted above, integrating disparate PaaS, cloud, and tools identities is a big friction point for enterprises deploying cloud data lakes. The SaaS platform of this disclosure automates a uniform authentication and authorization mechanism across analytic tools, PaaS engines, and the cloud storage resources, so that enterprise identities can be seamlessly managed with the SaaS data lake. This is a challenging due to the variety of authentication technologies (such as LDAP, Kerberos, Active Directory, etc) and connectivity models (such as web interfaces, APIs, and direct shell access) that need to be supported for the flexibility enterprise customers expect. To this end, the system configures the necessary identity management server solutions (such as FreeIPA), identity brokers (like Keycloak) to provide single sign on (SSO), and federated authentication via existing enterprise solutions. While these are specific implementation details, other similar offerings can also be used instead.

Provisioning and Integration of Data Processing Engines and Analytics Services

Figure 6:
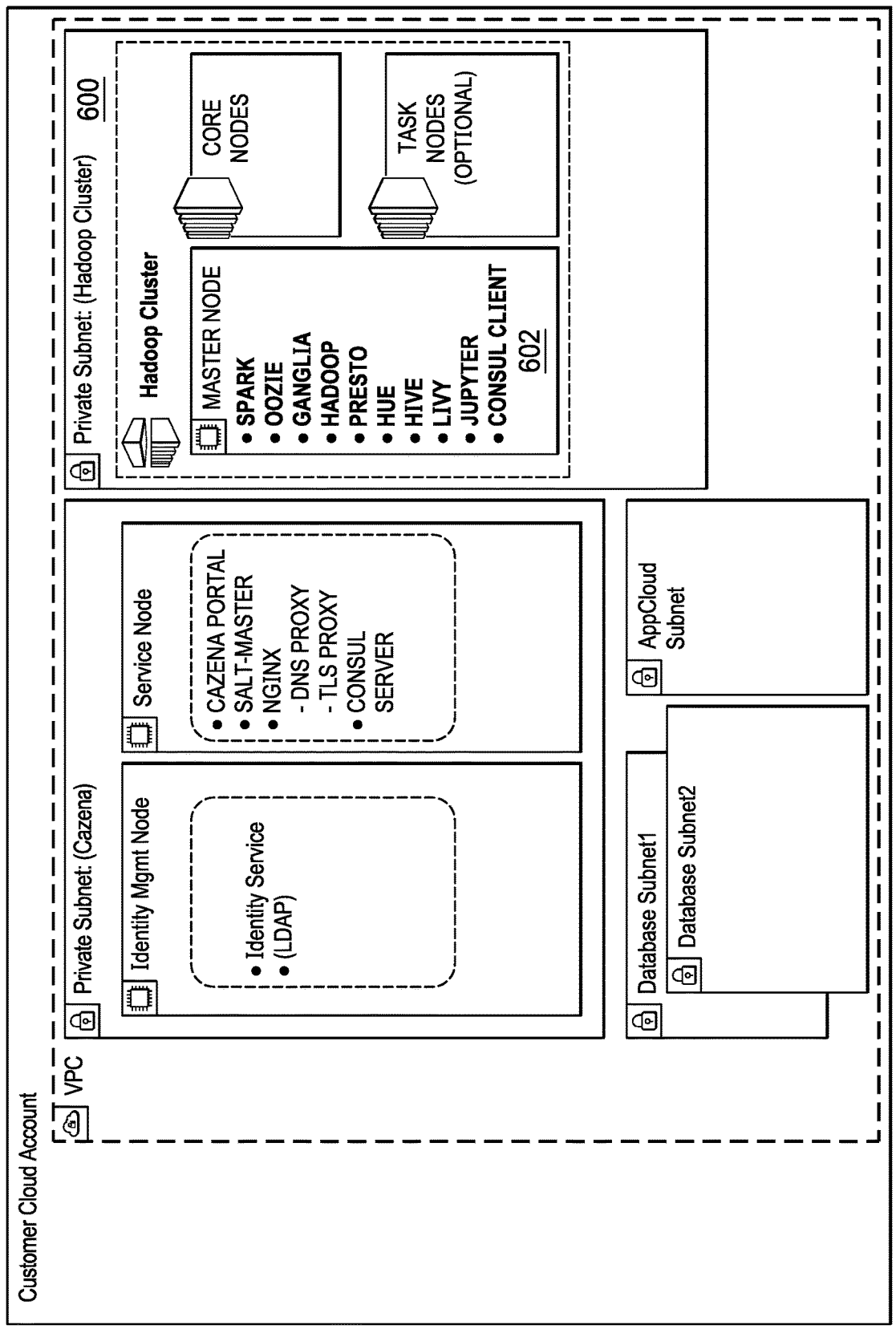
FIG. 6 depicts the provisioning of the data lake subnet.

With reference now to FIG. 6, within the data lake subnet 600, the orchestrator provisions and deploys specific data lake engines (CDP, EMR, etc.) and services (as examples, Hue, Jupyter, etc), across a pre-computed (custom size for customer workload) set of instances 602. The orchestrator also defines security rules for the data lake environment and the resources (nodes and services) within. The orchestrator defines DNS entries for services within the data lake environment (Hue, Jupiter, master node . . . ) so that users can directly interact with these services. The orchestrator also configures storage requirements, provisions storage buckets and defines access, both permissions and encryption on the cloud object Store (e.g., S3). Preferably two buckets are provisioned, one for data and one for configuration.

Configuration of User History and Service Persistence

Figure 7:
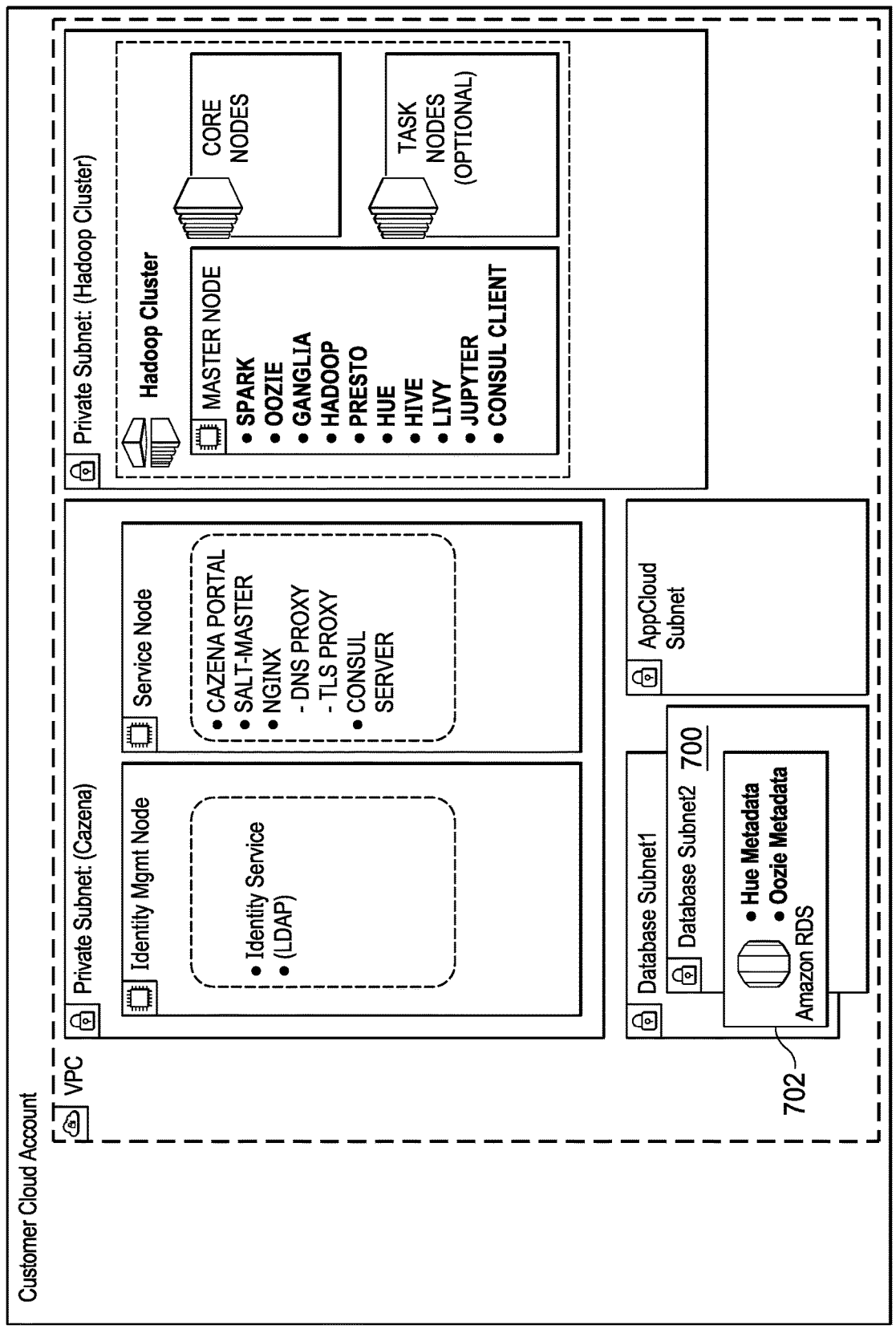
FIG. 7 depicts the provisioning of the database subnet.

As depicted in FIG. 7, within the database subnets 700, the orchestrator provisions a highly available database 702 to hold state from various data lake services so that the state is not lost when a cluster is destroyed and then recreated. Preferably, the master database resides in one subnet, the replica in the second subnet. The orchestrator also defines the security rules for database access.

Configuration of the Central Service to Hold Secrets

Preferably, the orchestrator also provisions a "secrets manager" service to hold passwords and encryption keys. The platform also ensures all secrets are encrypted with a key unique to each customer's deployment. Additionally, the platform applies secret access policies to ensure the principle of least access is maintained: only those entities that require access have access. The system automates the complexities and nuances of cloud secret management to avoid accidental or intentional misuse to ensure our customers' enterprises remain safe and secure.

Configuration of the DevOps and SecOps Monitoring and Alerting

Figure 8:
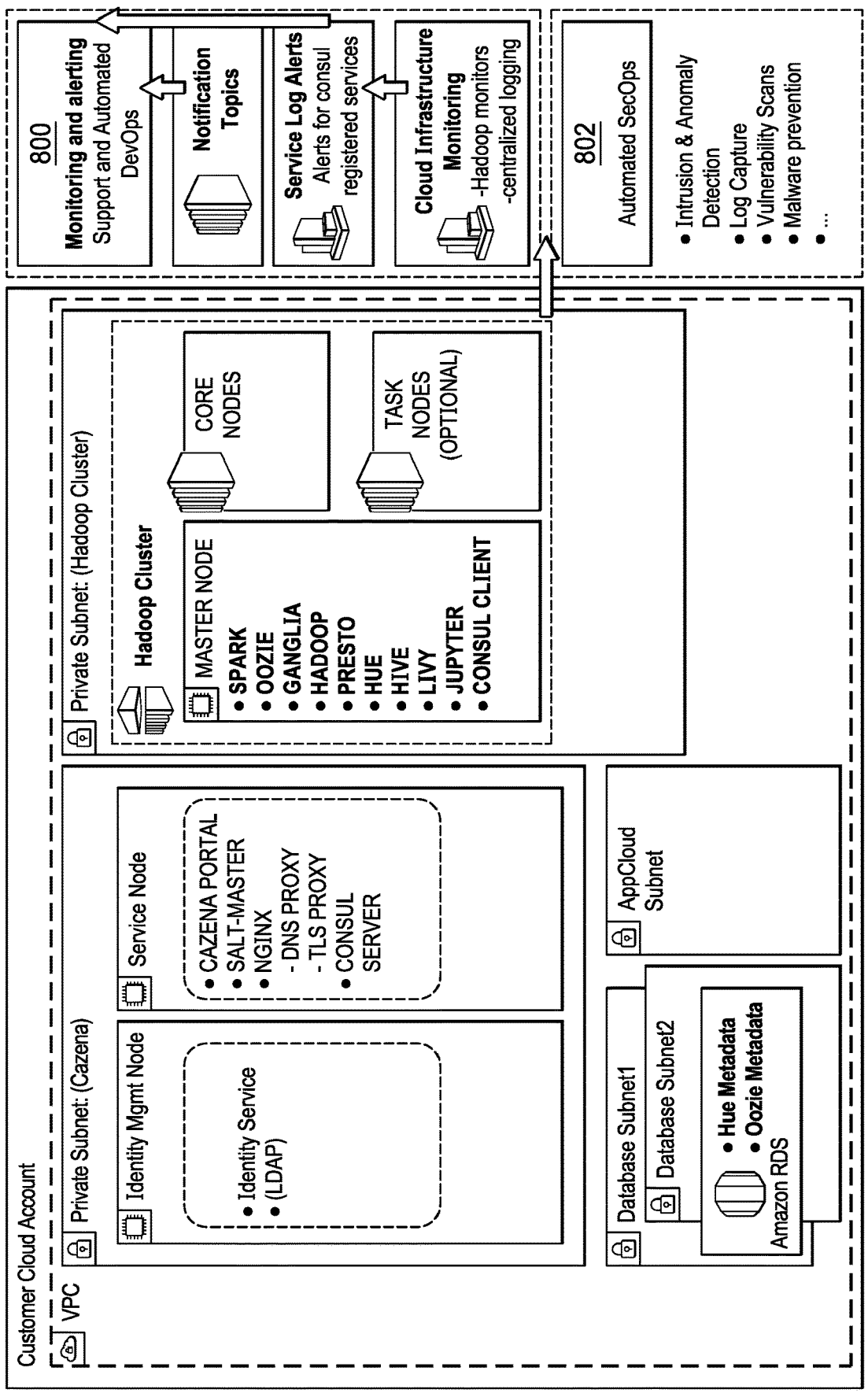
FIG. 8 depicts the provisioning of supporting SecOps and DevOps monitoring infrastructure.

As depicted in FIG. 8, the orchestrator also preferably defines DevOps 800 and SecOps 802 monitoring and alerts on the service node data lake services. Leveraging cloud native technologies (e.g., like AWS CloudWatch, Azure Monitor, and the like) and supplemented by cloud independent software (e.g., such as Splunk, Lacework, Sensu, and ManageEngine), the platform handles the challenge of exposing key metrics and logs to centralized alert rules in order to effectively manage each customer environment. Moreover, the platform preferably also distills each customer environment's key performance indicators to a centralized Operations hub to ensure that DevSecOps staff are aware of any and all inconsistencies across our customer base, all without needing to access the system(s) or perform time-consuming manual investigations. These capabilities allow the data lake SaaS model to scale as needed to satisfy SLAs across all enterprise customers.

Preferably, the platform provides robust scaling through automatic classification of notable events into several categories. For anything that requires immediate human intervention, preferably alerts are routed through an OpsGenie-powered dispatcher to the on-call staff for the area of the issue. These alerts can fire at any time of the day or night, so it is important to ensure they have immediate, actionable value to warrant this urgency. The next level of notice is for items needing eventual human intervention, which preferably are routed to Zendesk, where a ticket is automatically created for later action by service provider staff. This ensures there is a record of the issue that will be triaged and acted on according to its priority. The final category is for issues that are notable, but that do not necessarily require human intervention at the time raised. Those end up as log messages that can be surfaced in a variety of ways, or to train machine learning models to correlate with other factors, such as workloads ongoing at that time, so that the platform then evolves its automated responses for these issues.

Provisioning of AppCloud Hosts

Figure 9:
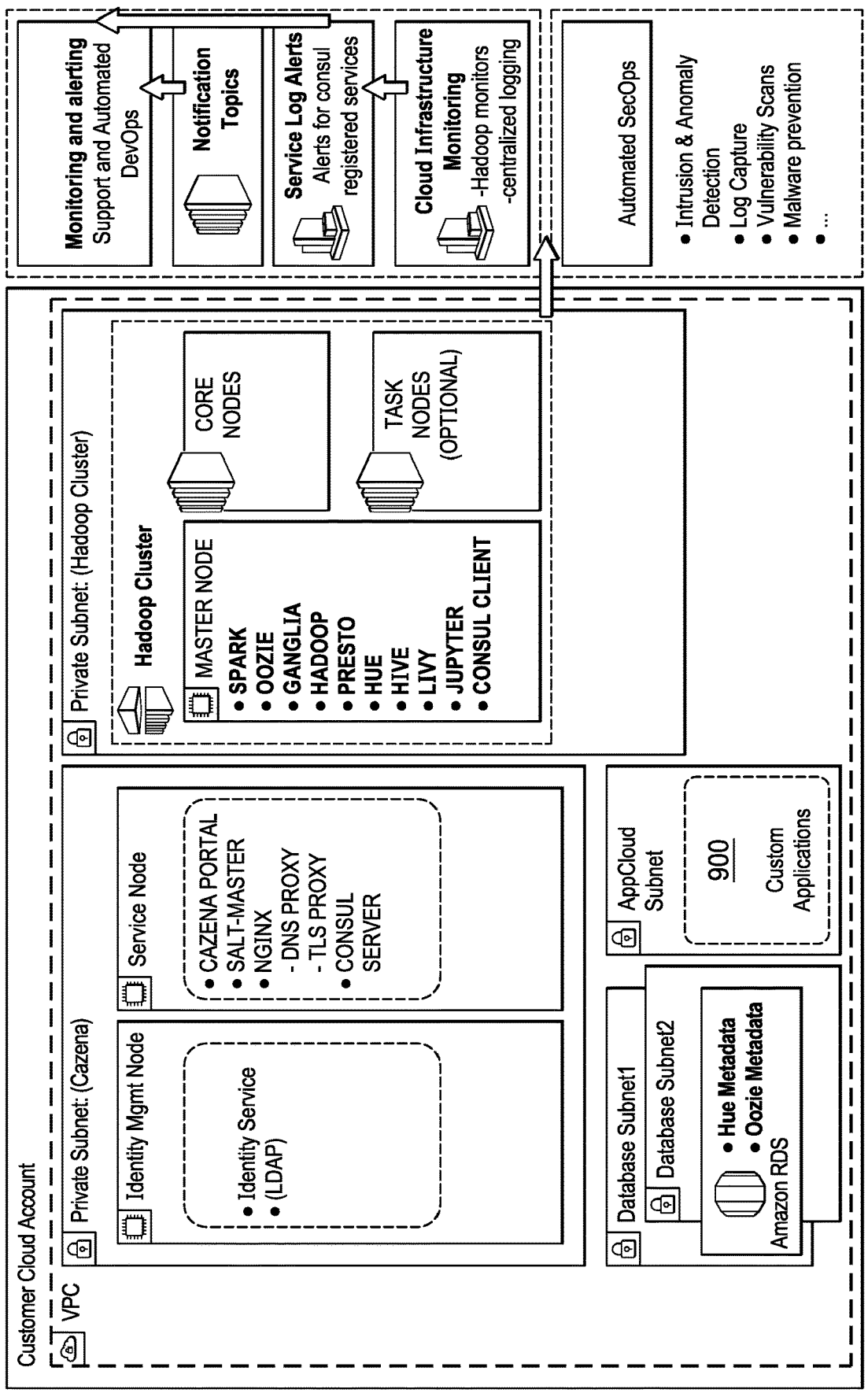
FIG. 9 depicts the provisioning of the cloud applications subnet.

As depicted in FIG. 9, and in the AppCloud subnet 900, the orchestrator provisions and configures a host to hold user-specified applications.

This completes the subnet provisioning. Although the subnet provisioning is preferably sequenced as has been described, this is not a limitation, as one or more subnets may be configured in parallel, or in one or more different sequences.

Security management & Configuration

Figure 10:
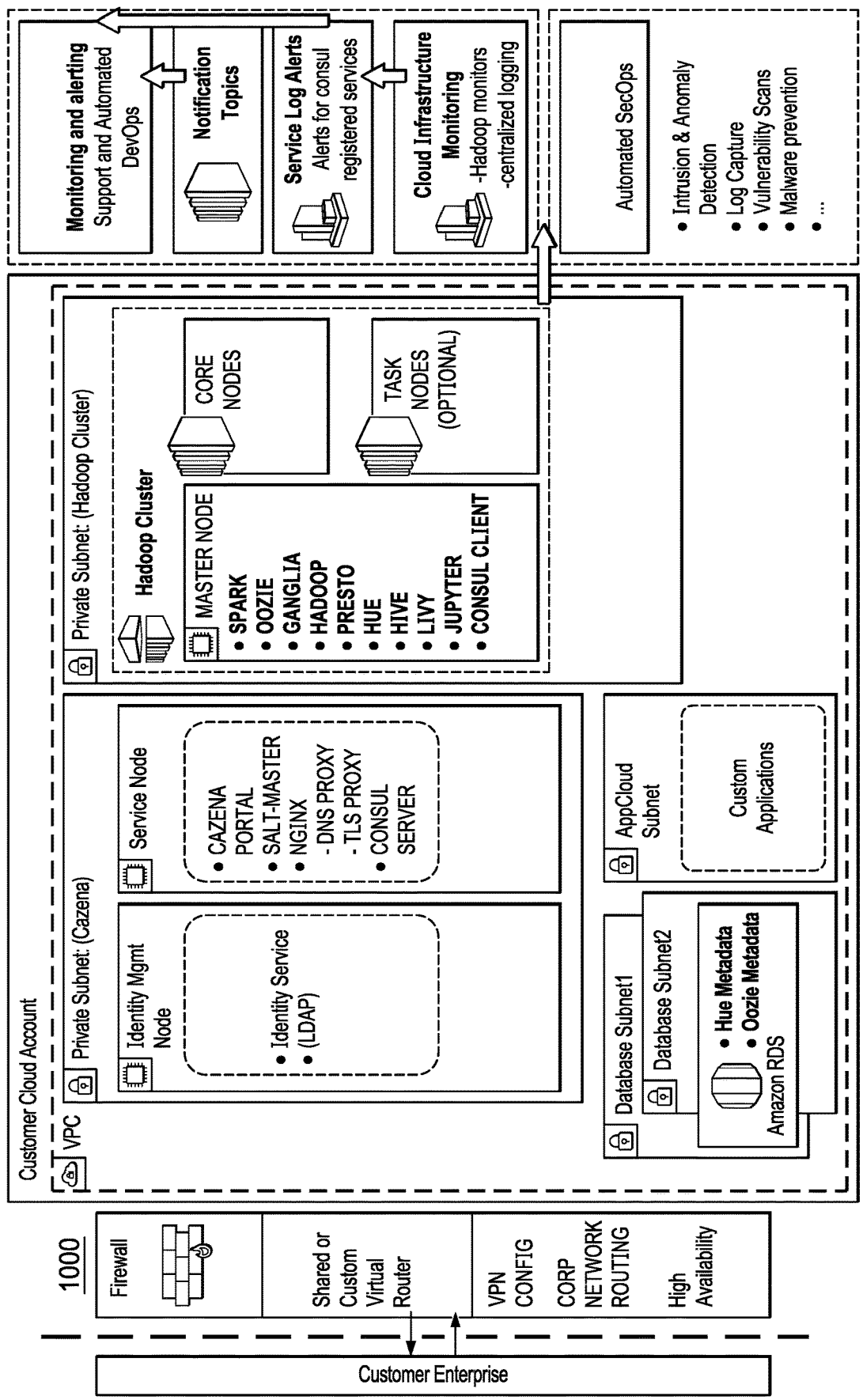
FIG. 10 depicts the provisioning of supporting security systems to ensure isolation of a customer's data lake.

As depicted in FIG. 10, preferably the orchestrator places the data lake environment behind a firewall 1000 to hide public IPs and provide a secure and auditable ingress to the data lake. The orchestrator also defines a Network Translation (NAT) gateway to translate external IP addresses to internal destinations. The orchestrator associates the firewall with the newly provisioned data lake, and the orchestrator also set ups specific security rules for firewall access.

The above-described SaaS-based platform automates the steps in the deployment of a generic PaaS or Cloud Data Platform, thus providing a dynamically-provisioned SaaS experience.

Scalable Security for SaaS Data Lakes

The following provides additional details regarding the providing of scalable security for SaaS data lakes that have been provisioned as described above.

Figure 11:
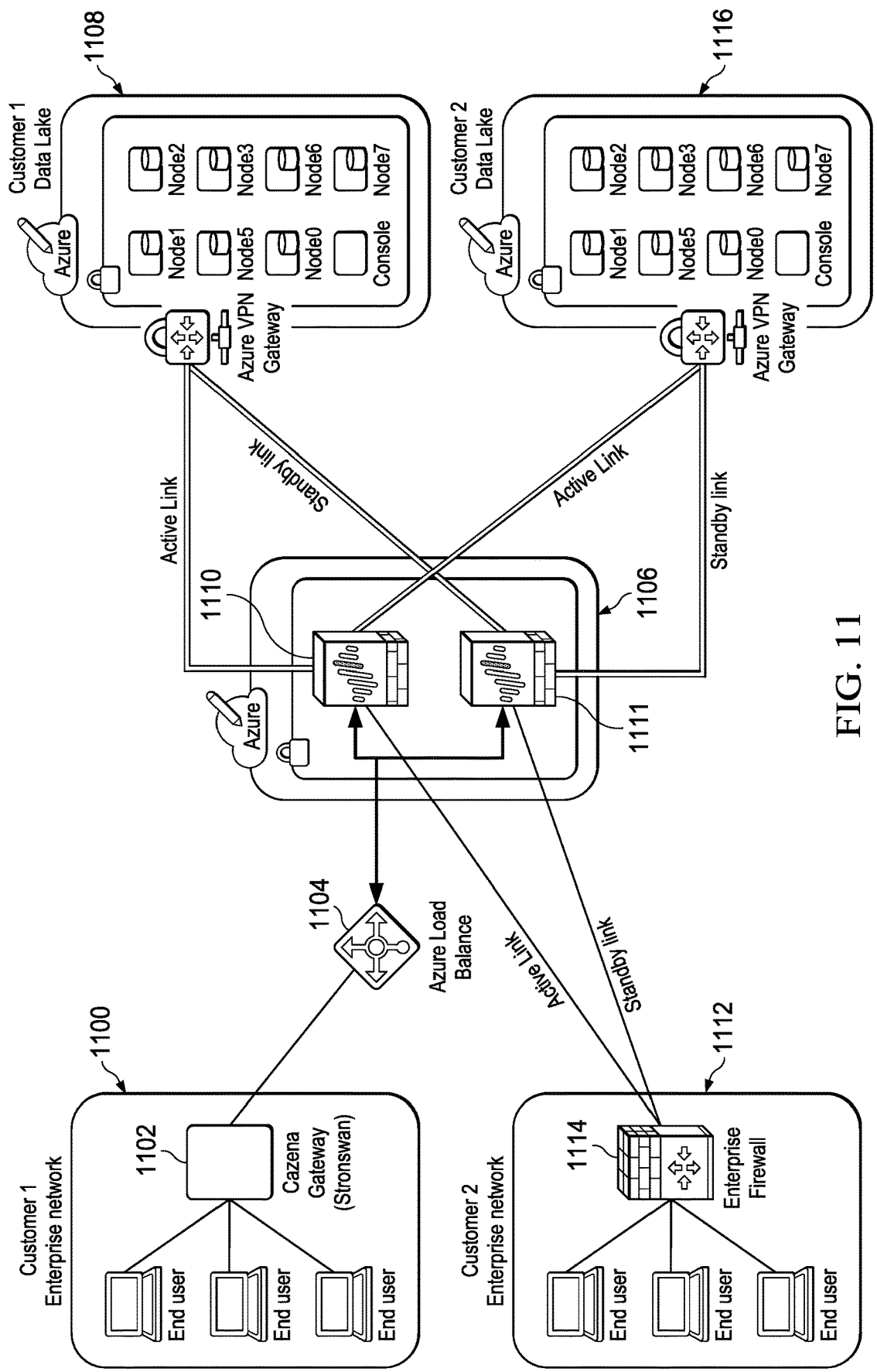
FIG. 11 depicts a first network architecture (e.g., based on Microsoft Azure) for security of SaaS data lakes that are configured as single-tenant deployments.
Figure 12:
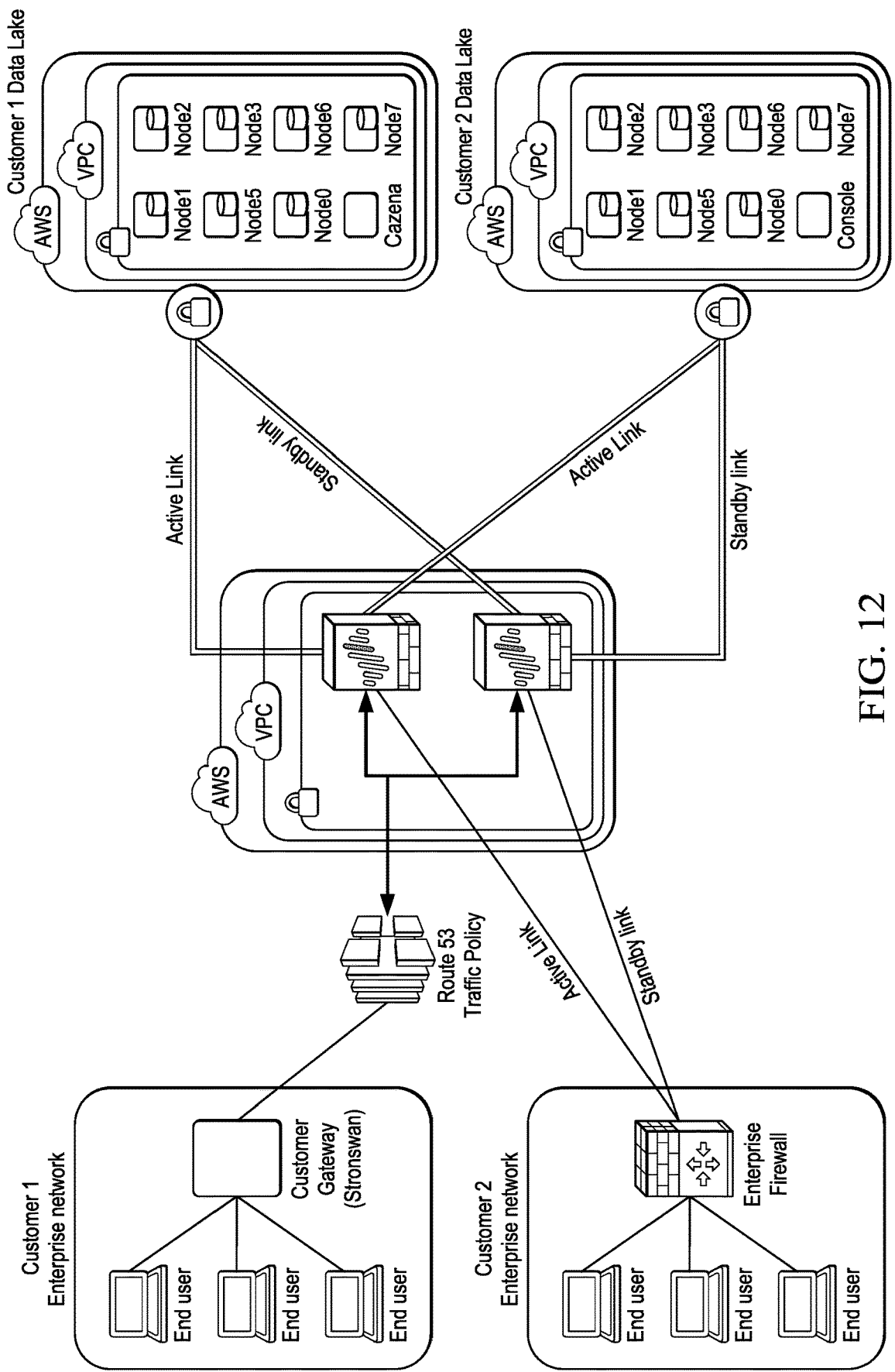
FIG. 12 depicts a second network architecture (e.g., based on Amazon AWS) for security of SaaS data lakes that are configured as single-tenant deployments.

FIG. 11 depicts a first multi-tenant network architecture (e.g., based on Microsoft Azure) for security of SaaS data lakes that are configured for single-tenant deployment. As depicted, the first customer enterprise network 1100 is coupled through the service provider gateway 1102, through a load balancer 1104, and then through a centralized perimeter security service 1106 supported in Azure, which service is configured as a front-end to the data lakes, such as data lake 1108 associated to the first customer. As depicted, the service provider gateway 1102 hosts a firewall pair comprising a first firewall 1110, and a second firewall 1111. In this example, a second customer enterprise network 1112 is coupled through the enterprise's own firewall 1114 directly through the security service (via service provider gateway 1106), and is coupled to a data lake 1116 associated to the second customer. The first firewall 1110 in the pair provides active links, namely, an active link between the customer enterprise network 1100 and the first customer's data lake 1108, and an active link between the second customer's enterprise network 1112 and the second customer's data lake 1116. The second firewall 1111 provides standby links to provide a fully-redundant failover architecture. FIG. 12 provides a similar network architecture for scalable security of SaaS data lakes that are hosted in Amazon AWS. In these examples, a service provider team configures and manages secure access to the data lakes, as well as monitoring traffic policy. As the system scales (i.e., as large number of data lakes are provisioned within unique PDCs and for multiple different customers), it a preferred to implement a solution such as now described.

Figure 13:
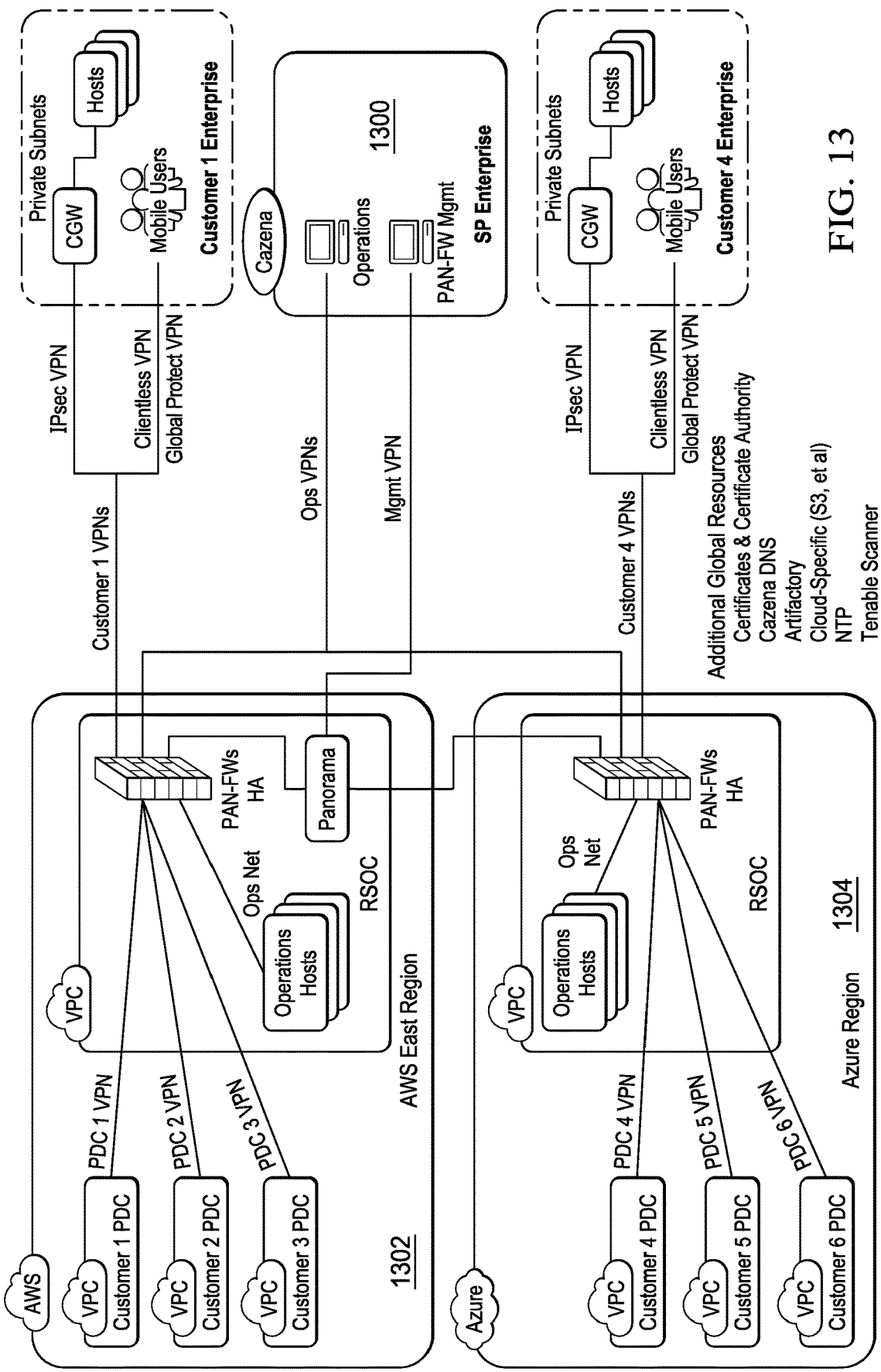
FIG. 13 depicts a preferred multitenant-based security architecture of this disclosure in a representative embodiment.

In particular, FIG. 13 depicts security architecture of this disclosure in a representative embodiment. In this configuration, it is assumed that the above-described automated provisioning techniques have been used to implement a plurality of private data clouds (PDCs) and in this example scenario on behalf of a plurality of different (distinct) enterprise customers. An enterprise customer is assumed to be operating its own enterprise network, and two such networks (corresponding to Customer 1 and Customer 4) are shown. In this example, the service provider operates the overall system in association with its enterprise network 1300. As also depicted, the service provider has provisioned a first subset of PDCs (Customer 1 PDC, Customer 2 PDC, and Customer 3 PDC) in a first cloud provider region 1302, as well as a second subset of PDCs (Customer 4 PDC, Customer 5 PDC, and Customer 6 PDC) in a second cloud provider region 1304. Cloud provider regions 1302 and 1304 are depicted as being supported in distinct clouds, e.g., AWS and Azure. This is not a limitation. Although not shown in detail, enterprise customers 2-3 and 5-6 operate their own dedicated enterprise networks. In this approach, the service provider has a view into each and every one of the data lakes that it has provisioned on behalf of its customers. In particular, and as will be further described, the depicted architecture allows for a service provider staff (of even modest size) to administer security to a large (100's) number of PDCs across a wide geography. The technique herein provides simpler administration and control, as well as greater visibility into network traffic passing between a customer PDC and its enterprise (e.g., by classifying traffic at the application level and attributing it to authenticated users). The approach also allows for security policies and monitoring to be accomplished using those attributes. Additionally, each customer PDC outbound network traffic can be explicitly allowed and monitored. According to this disclosure, it is assumed that the data and data store systems reside off premise, namely, in the cloud, and that they are accessed from corporate (remote) networks, such as Customer 1's enterprise network.

In general, the approach herein provides for a scalable solution by which the service provider configures, monitors and supports many single-tenant deployments, such as those depicted above in FIGS. 11-12. To this end, the following security requirements are provided:

Shared service architecture—preferably, virtual firewalls connecting PDCs are located within the same cloud platform and region as the PDC. All (or substantially all) PDC traffic flowing in and out of the virtual cloud network passes through the virtual firewalls, preferably in a hub-and-spoke design. This network design reduces network latency and increases bandwidth between the firewall and the PDC.

Preferably, the service provider's customers are assigned their own gateway on the firewall for accessing their PDC service. Security policy rulesets, network routes, NAT rules and intrusion prevention profiles, and other security requirements preferably are all unique to each customer. This configuration ensures traffic is kept separate from other customers.

High availability (HA)—preferably deployment includes a minimum of two virtual firewalls for each cloud region placed in an availability group, with their configurations mirrored through automation to provide redundant access paths to the PDC services. The multiple firewalls eliminate single points of failure. Preferably, a cloud platform load balancing service is used to distribute a DNS response to each customer gateway endpoint on the firewall, preferably in a round robin fashion. The load balancer also maintains the health of the connection by monitoring a service on the PDC. If the service provider's PDC service fails to respond, preferably the load balancer temporarily removes the gateway endpoint from the DNS response. High availability is enabled by:

Configuring policies that determine which endpoint is given during the DNS response. This can be done in a simple round robin fashion or using AWS Route 53 Routing Policies.

Client-side load balancing. A list of application endpoints is maintained by a client application. The client selects endpoint to which to connect, preferably based on logic programmed into the client.

Server-side load balancing. Clients connect to a load balancer, which then forwards requests to application servers, preferably based on a list maintained on the load balancer.

High availability is achieved by distributing application load across the customer's data centers and using monitoring to determine endpoint availability. Using routing policies, a customer can have Route 53 automatically failover to a known good region if another region becomes unavailable for some reason.

Network Load Balancing is well-suited for load balancing of TCP traffic where high performance is required. Operating at the connection level (Layer 4), a Network Load Balancer routes traffic to targets, e.g., within Amazon Virtual Private Cloud (Amazon VPC) and is capable of handling millions of requests per second while maintaining ultra-low latencies. Preferably, the Network Load Balancer is also optimized to handle sudden and volatile traffic patterns between the firewall peers, and it ensures seamless failover if a peer goes down. Setting up two firewalls in a HA pair provides redundancy and helps ensure business continuity.

End-to-end encrypted traffic—prevents network sniffing of the data.

Two-factor authentication of users—prevents unauthorized access to the system. Ensures a given business user can only access their business-specific data and not that of another business entity.

Decryption—Inspect inbound SSL connections coming into the service

Threat Prevention—Inspect all inbound connections and automatically detect and block threats These requirements are discussed in detail in the following sections.

End-to-End Encryption

Figure 14:
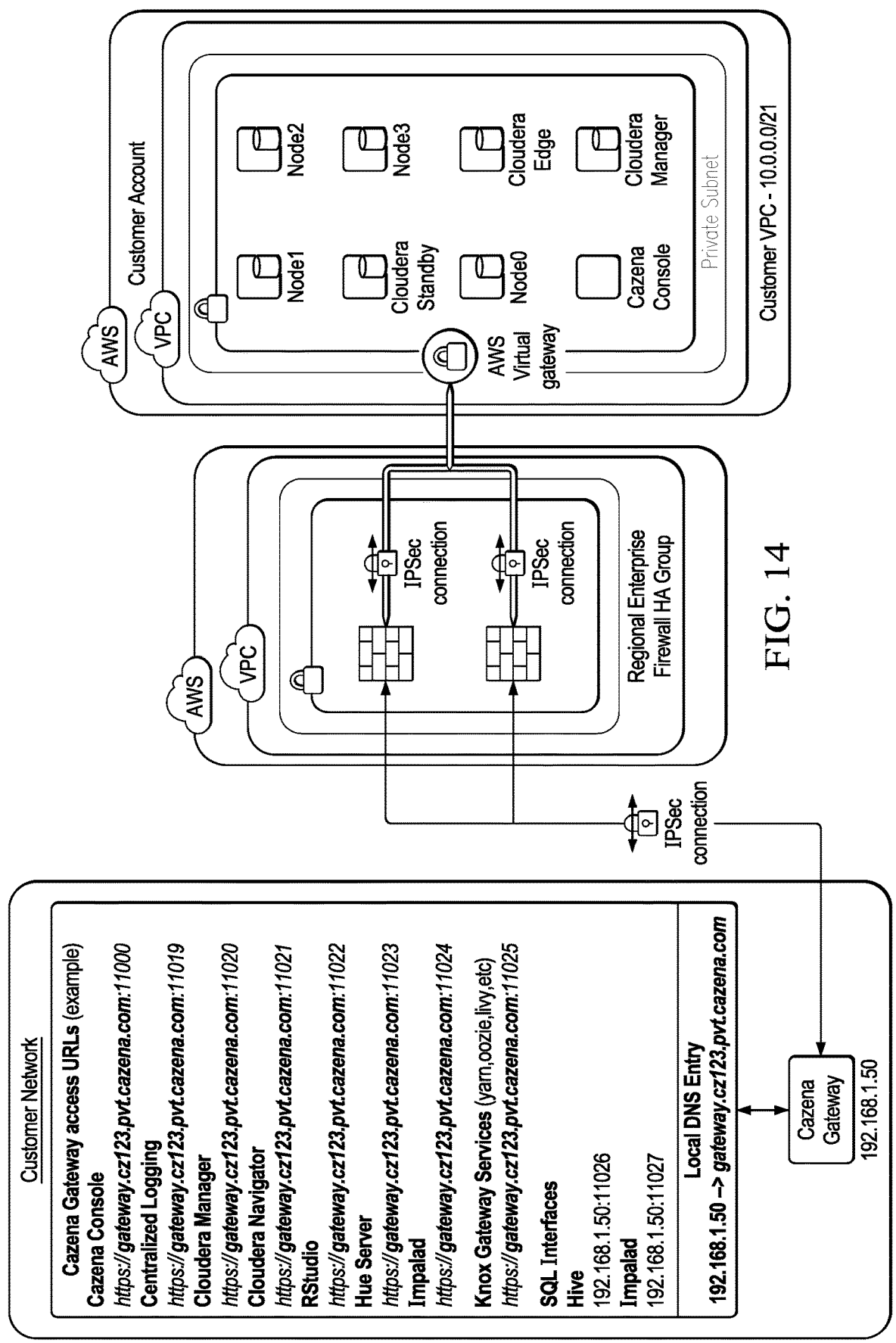
FIG. 14 depicts the network architecture using a service provider's gateway according to another aspect of this disclosure.
Figure 15:
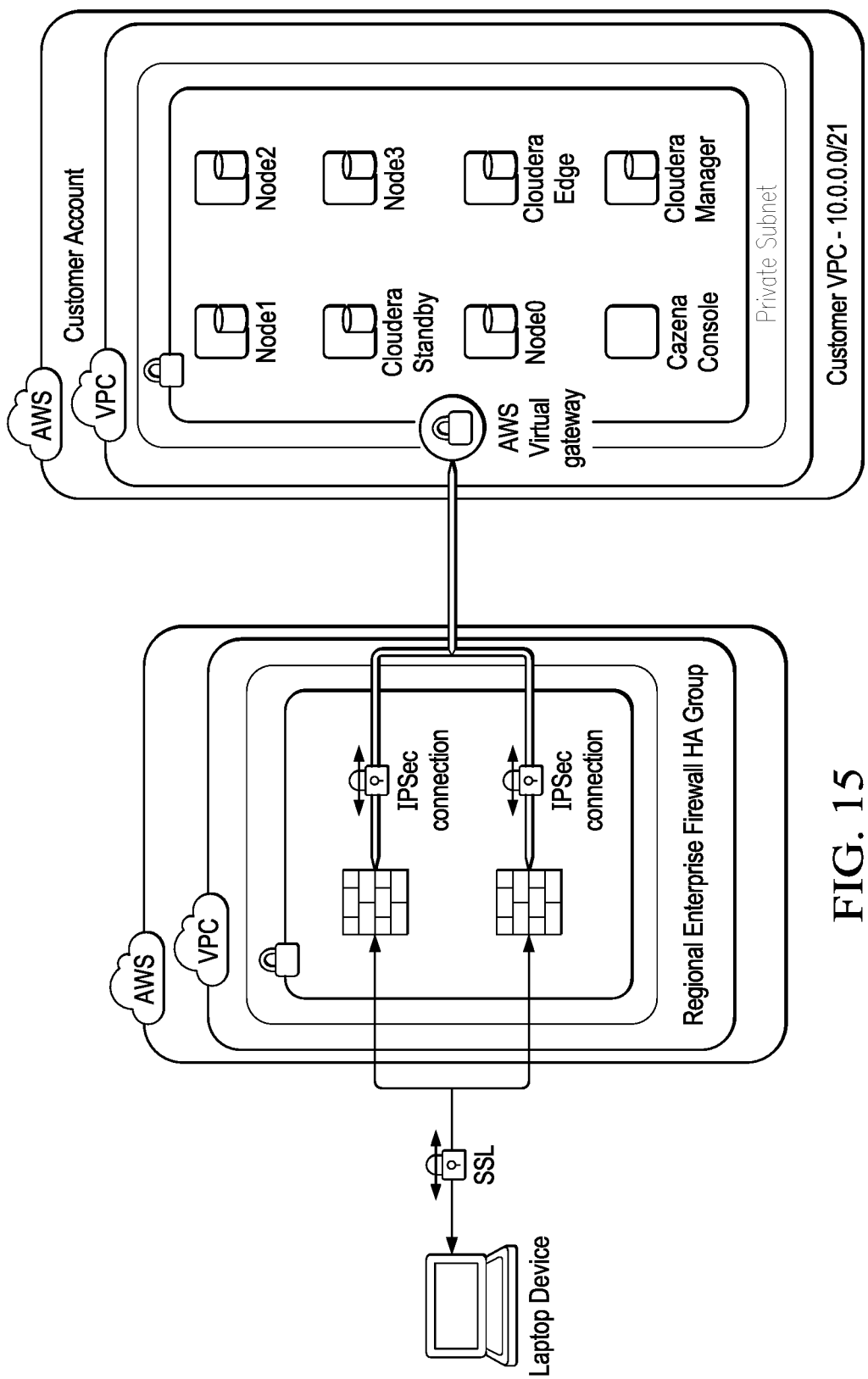
FIG. 15 depicts an alternative use case to FIG. 14 whereby an end user is connected via the service provider gateway in a client-less VPN manner.
Figure 16:
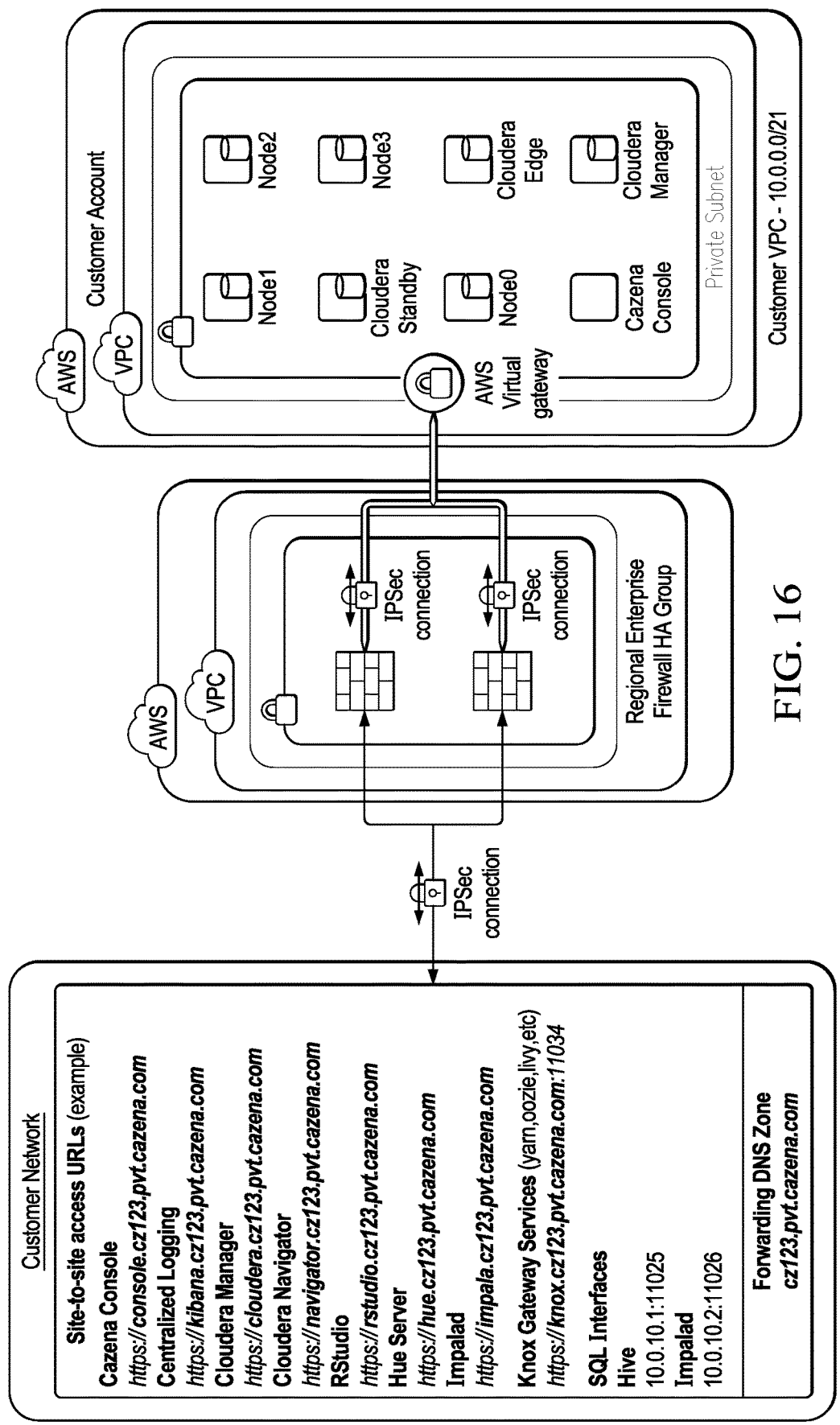
FIG. 16 depicts another use case involving site-to-site VPN connectivity through the service provider gateway.

Preferably, every hop of the network from the client invoking the request to the endpoint service is encrypted using Transport Layer Security (TLS). The system is accessed via three (3) distinct pathways:

One path provided in this architecture is as follows: a client browser connects to Client VPN (Gateway process) to Firewall. In this access path, as depicted in FIG. 14, the client process connects to a gateway process via TLS. The gateway connects to the Firewall via IPsec tunnel. In an alternative pathway, client-less VPN to firewall (for HTTPS-based communication) is provided. In this access path, as depicted in FIG. 15, the client process is communicating over encrypted HTTP and directly connects to the firewall over HTTPS protocol. Finally, another pathway is site-to-site VPN. With a site-to-site VPN, as depicted in FIG. 16, an enterprise securely connect its corporate network with service provider firewalls to access data lake services on private networks. From the firewall, the connection is routed to the customer specific PDC, preferably via an encrypted tunnel (IPSec Tunnel).

Two-Factor Authentication of Users

Two-factor authentication requires the user to supply additional proof of identity beyond the username/password. In this case, the added identity requires valid client authentication certificates. Preferably, the firewall issues and manages the revocation of client authentication certificates. In the event the private key of the authentication certificate has been compromised, the firewall is configured as an Online Certificate Status Protocol (OCSP) responder. When a client authentication certificate is used in the authentication process, preferably the firewall checks the status of the certificate using OCSP to determine the certificate status (good, revoked, unknown). Depending on the configuration, the firewall then allows or denies the connection to the client Single Tenant Data/Environment Preferably, each customer's environment, and their PDC, is provisioned in a virtual network within a cloud provider (AWS VPC or Azure VNet). The virtual network logically isolates the PDC from other cloud processes and users. Preferably, the service provider makes use of cloud security groups and network access control to only allow access to those authorized to access that PDC.

Preferably, no PDC resources are shared between or among customer accounts.

Centralized Perimeter Security for Many PDCs

In this architecture, typically one firewall pair is configuring access to many (e.g., 10+) PDCs. It is the central point of entry for multiple back-end data lakes (PDCs). The firewall defines perimeter security between PDCs, with access rules, policy and routing for each private customer data lake. The firewall in this architecture is leveraged, preferably with one firewall providing access to multiple customer environments. Border Gateway Protocol (BGP) is used between the service provider's firewall and the cloud platform to dynamically share routes and to set route preference in addition to centralized management. In this manner, the architecture also provides centralized security alert and auditing.

Figure 17:
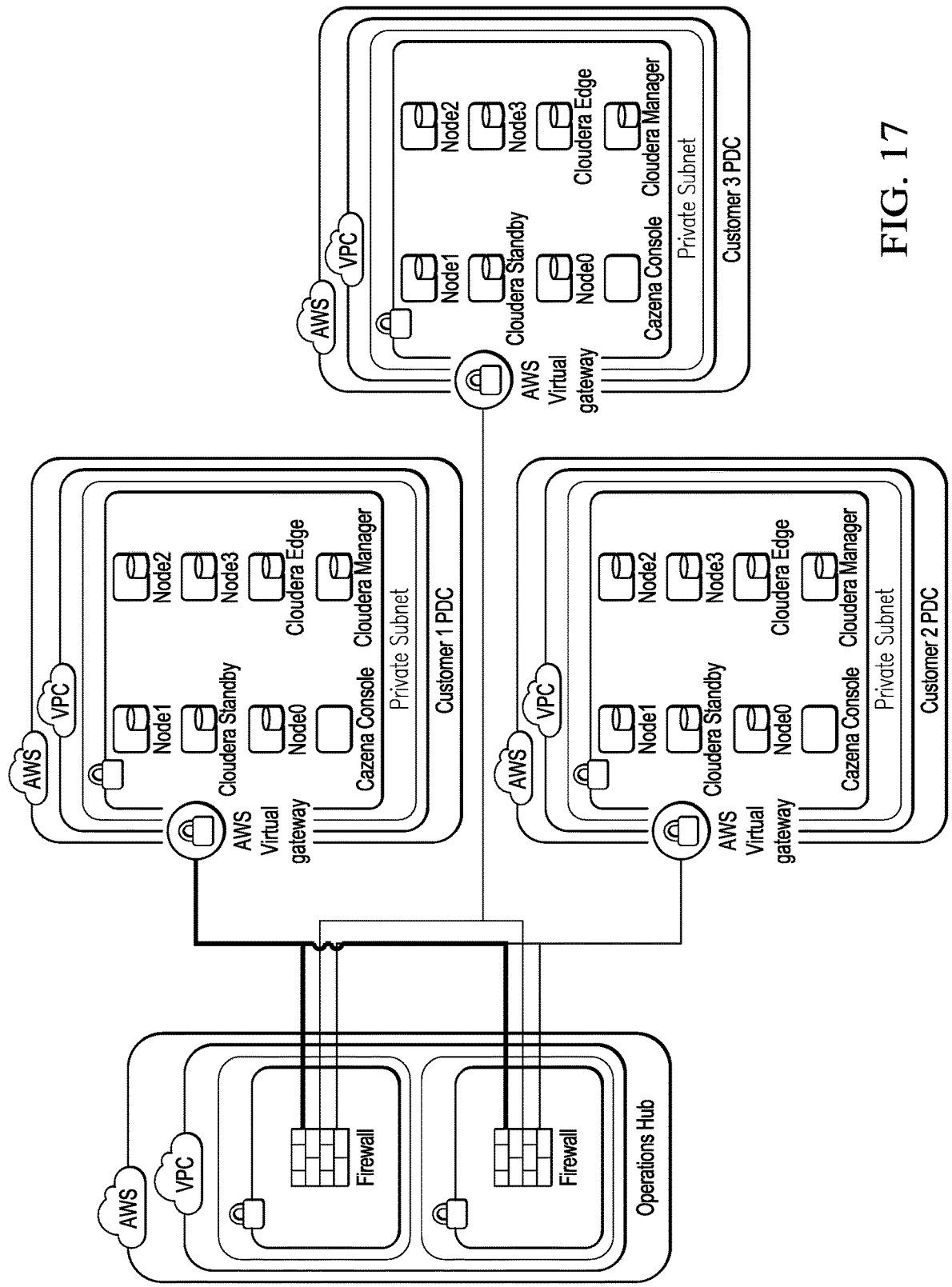
FIG. 17 depicts centralized perimeter security provided by the security architecture of this disclosure.

FIG. 17 depicts centralized perimeter security provided by the security architecture of this disclosure.

High Availability, No Single Point of Failure

The infrastructure that provides scalable access to PDCs preferably includes redundancy at the firewall and identity server level. This means that if a failure of some sort (machine or man) occurs at the egress or access point, a secondary (backup) process assumes the primary master role to deliver continued access to the PDC across the fault. In this architecture, preferably one firewall is configuring access to many (10+) PDCs. Thus, a failure of a firewall can prevent access to many (not just one) customer environment. As such, it is important that this entry point be highly available.

Threat Prevention

The virtualized firewalls preferably are configured to use a combination of antivirus, anti-malware, vulnerability protection, and URL filtering to automatically defend the service against threats originating from the Internet or from within a customer's environment.

Decryption

Preferably, traffic decryption profiles are used to decrypt and inspect incoming traffic to the service. Using the same wildcard SSL certificate installed on the services, the provider can decrypt traffic and prevent malicious encrypted content from entering the service.

The above-described security framework, whereby the service provider provides a centralized security container that supports the insertion of a large number of tenants and their associated data lakes, approach provides significant advantages. As the service provider provisions data lakes, tenant-specific security requirements are enabled at the firewall(s) in a highly-available and scalable manner, even as the service provider configures large number(s) of data lakes. The service provider manages the entire set of data lakes, preferably via a central support infrastructure that it manages and operates on behalf of the tenants. The service provider provides this operations environment across multiple cloud providers (e.g., AWS, and Azure), and across multiple regions of such multiple cloud providers. As each data lake is provisioned in a cloud region, the service provider obtains another partition of the firewall and associates that slice with the newly-provisioned data lake. The inline firewalls provide customer segmentation, application filtering, and protection against threats and data exfiltration. The service provider continuously monitors each customer's traffic for malicious activity and unauthorized behavior on the network cloud parameters. Threat protection includes, without limitation, anti-virus, anti-spyware, vulnerability protection, URL filtering, file blocking, data filtering, distributed denial of service protection, and the like.

A particular firewall may have multiple partitions (slices). A firewall partition associated (assigned) to a particular data lake (or, more generally, the tenant) acts as a virtual router of traffic to and from the data lake.

For completeness, the following provides additional implementation details.

Figure 18:
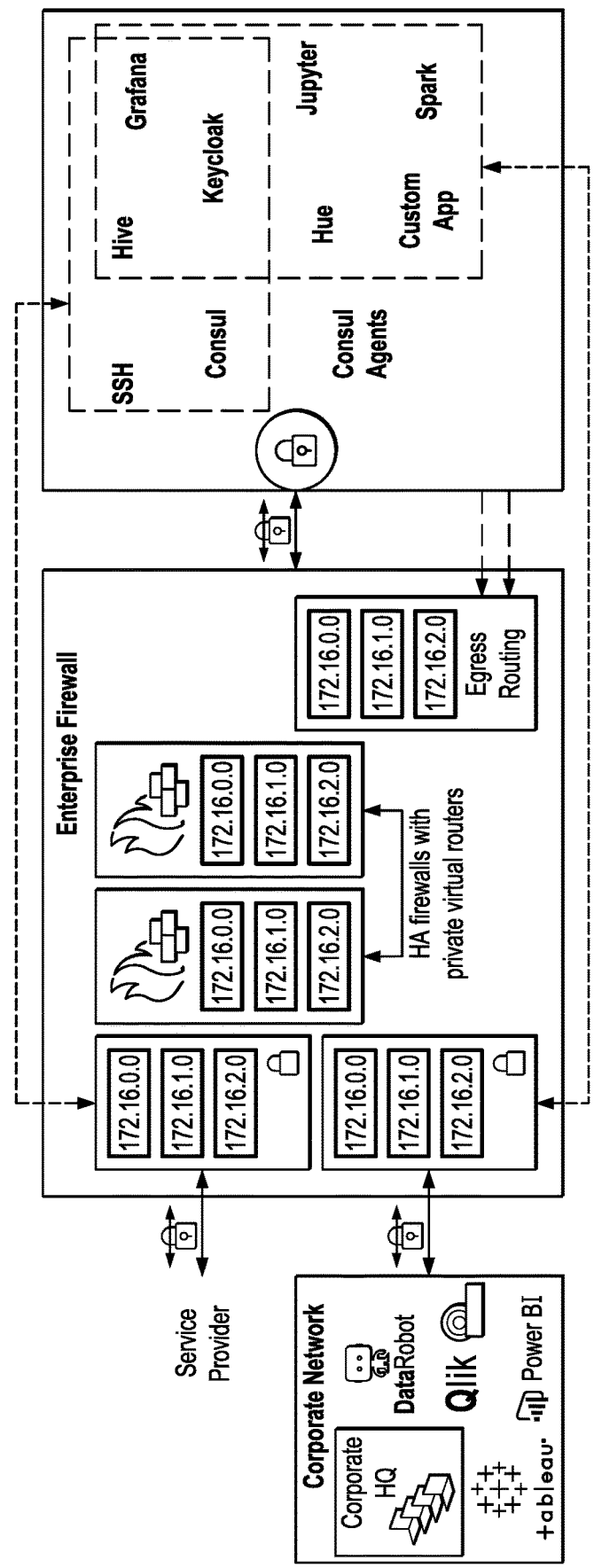
FIG. 18 depicts secure enterprise access when the service provider owns the account associated with the deployment account.
Figure 19:
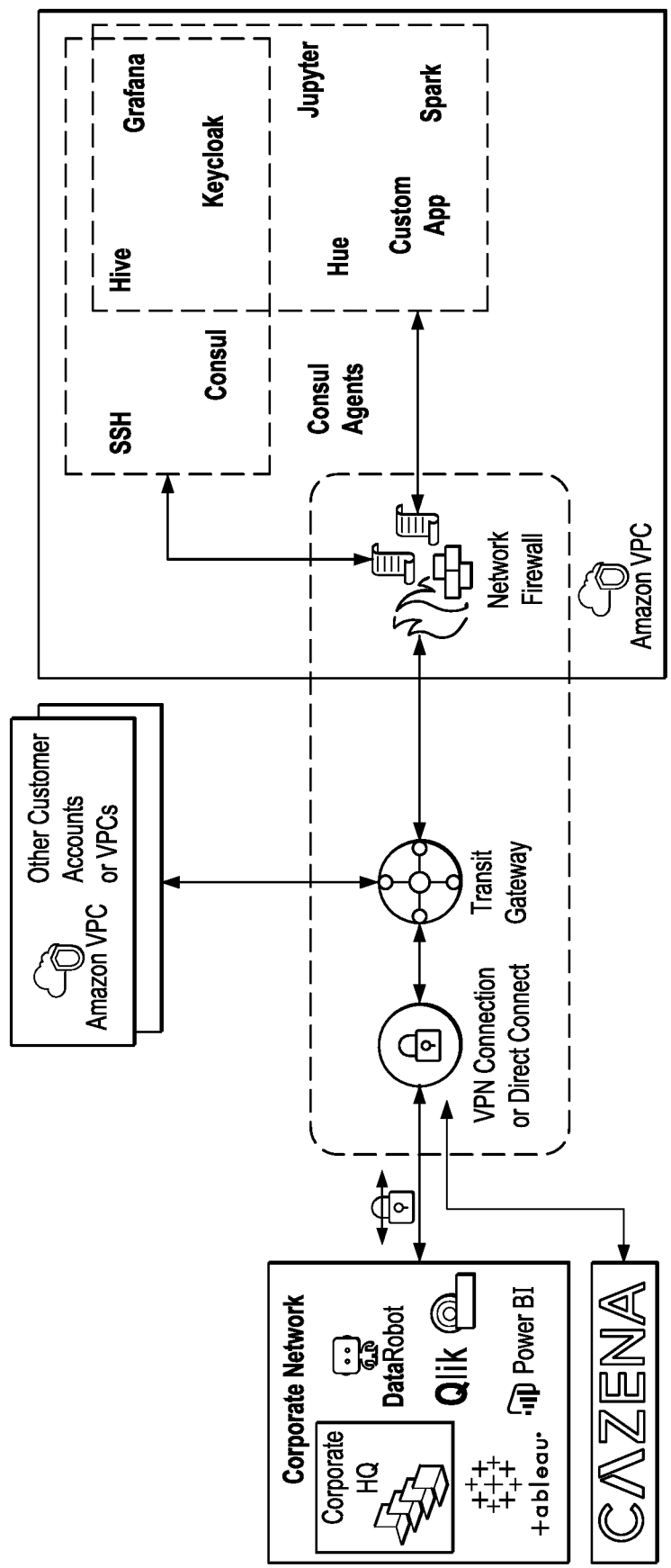
FIG. 19 depicts secure enterprise access when the customer owns an account and desires to connect to the provisioned infrastructure via its own connectivity.

FIG. 18 depicts a preferred technique for secure enterprise access to the cloud account deployment (and in particular the customer's PDC 1800) provisioned for the customer 1802 by the service provider 1804. This is a typical configuration where the service provider 1804 has deployed the PDC 1800 (the deployment account) in one of the service provider's accounts. In this embodiment, the service provider has a separate account in which a firewall service 1806 is executing. The service provider 1804 connects for providing support, and the customer's enterprise network 1802 connects as previously described. The firewall service 1806 runs high availability (HA) firewalls that are synchronized via private virtual routers. Within the firewall service, firewall settings are synchronized, rule sets are duplicated as necessary, vulnerability policies are updated, etc., and egress routing is monitored. Different profiles may be provided for different access (e.g., by the service provider, or by authorized enterprise users). In an alternative embodiment, the customer owns the AWS account, the secure enterprise access may occur through a transit gateway. In this embodiment, as shown in FIG. 19, a network firewall 1900 is deployed in association with the customer's PDC (still deployed in a separate account) and connects to a transit gateway 1902. In this embodiment, the customer enterprise network direct connects via a VPN connection 1904 coupled to the transit gateway 1902.

Figure 20:
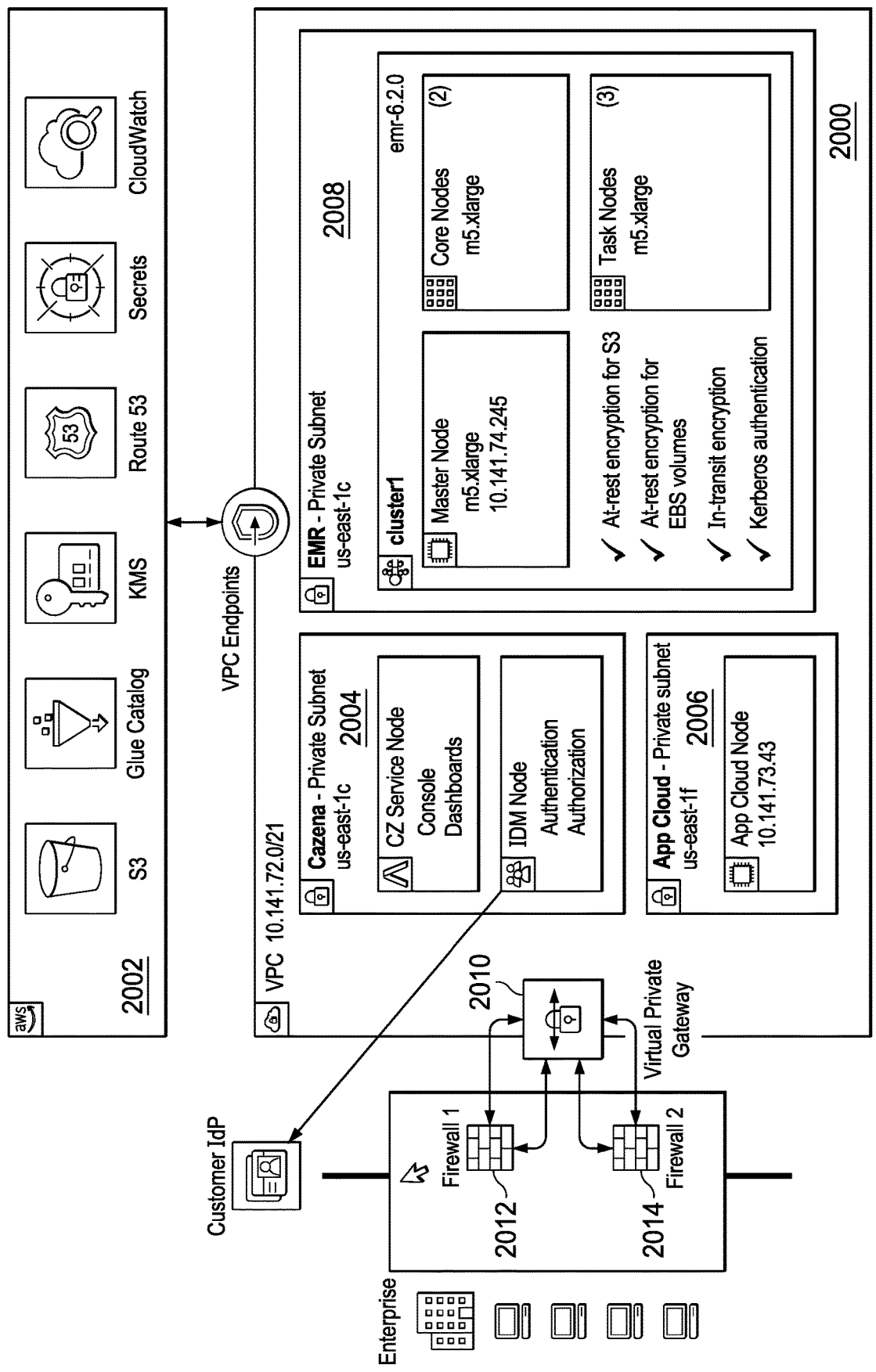
FIG. 20 is visualization of an example set of infrastructure that has been provisioned for a customer according to the techniques described above.

FIG. 20 a representative visualization of an example set of infrastructure that has been provisioned for a customer according to the techniques described above. As has been described, the platform provides for rapid deployment and instantiation of a data lake within a virtual private cloud (VPC) 2000 (referred to above as PDC) that includes various subnets as previously described. In addition to setting up the account, the service sets up all of the VPC endpoints and associated services 2002. The VPC 2000 comprises a first subnet 2004 hosts the service provider's services, such as the console, various dashboards, and the authentication and authorization services. A second subnet 2006 hosts AppCloud, which can be used to enable third party products and services that the customer uses to be hosted with the VPC. The third subnet 2006 in this example is used to host the EMR service on which one or more analytics products and services execute. The VPC itself is connected to a firewall pair (firewalls 2012 and 2014) via a virtual private gateway 2010. Preferably, there is a firewall pair provisioned per AWS region. If the enterprise has its own firewall (not shown), that firewall is connected to the firewall pair via site-to-site VPN. In this configuration, the enterprise users can use existing DNS entries to access the provisioned infrastructure. Likewise, any of the services within the provisioned infrastructure can access on-premises resources (e.g., an enterprise database) via the firewalls. This network connectivity is seamless and secure because the firewalls enforce security policies and provide audit controls. Further details regarding the SaaS-based rapid deployment system is described in Ser. No. 17/375,096, the disclosure of which is incorporated herein by reference.

Figure 21:
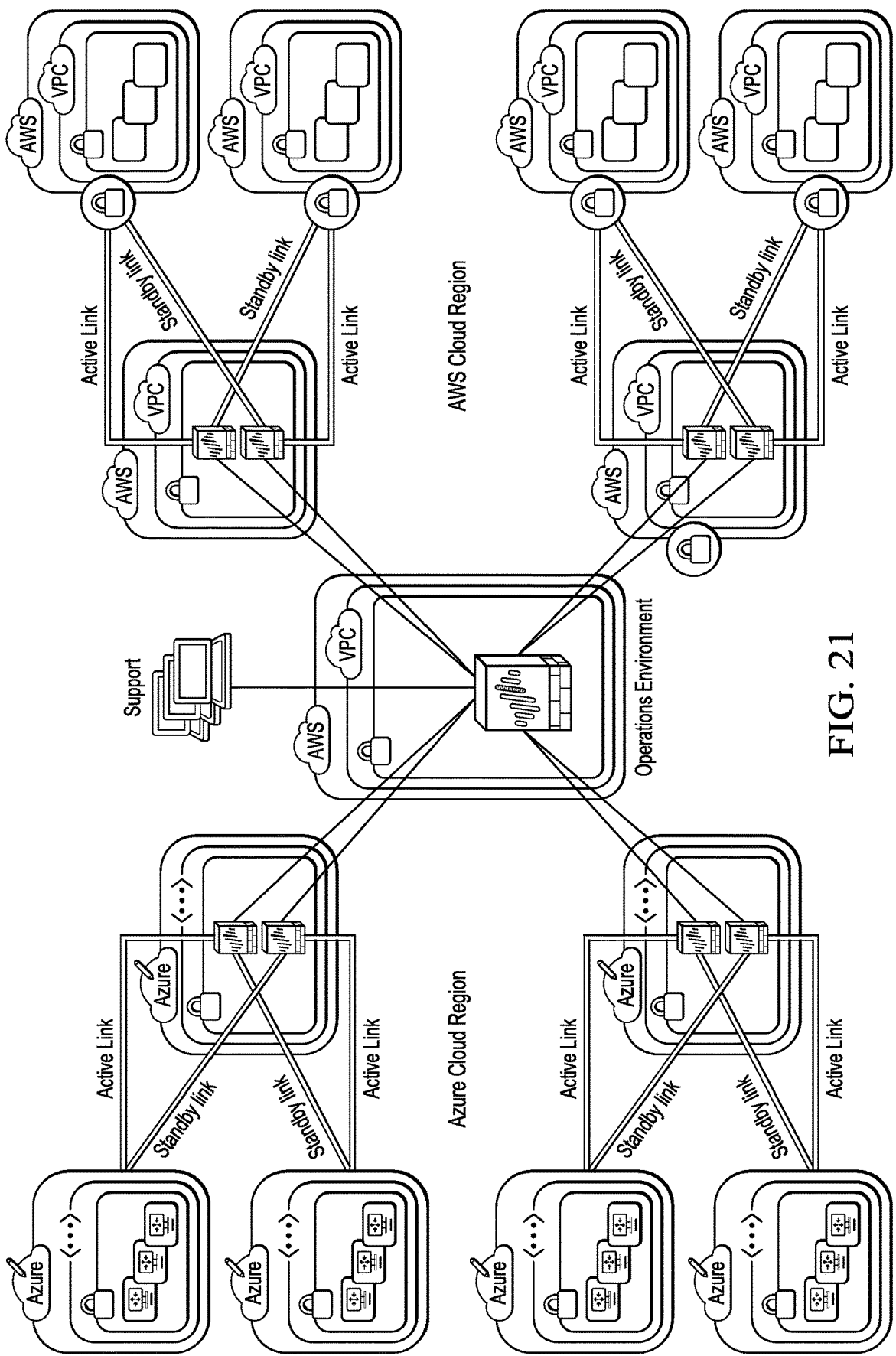
FIG. 21 depicts a representative hub-and-spoke scalable security architecture of this disclosure.

FIG. 21 depicts a representative hub-and-spoke architecture for the scalable security solution of this disclosure, and wherein many PDCs are provisioned in multiple cloud providers. In particular, and in this example, Azure customer deployments in Azure regions are shown on the left, and AWS customer deployments in AWS regions are shown on the right. The security framework thus is multi-cloud. The solution is not limited to these cloud providers, as many others (e.g., Google Cloud Platform (GCP)) may be utilized to host the PDCs. FIG. 21 also depicts the active and standby provisioning, such as has been described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the ingest, index, search and retrieval functions is non-transitory.

A given implementation of the disclosed subject matter is software written in a given programming language that runs on a server on commodity hardware platform running an operating system, such as Linux.

As noted above, the above-described SaaS orchestration functions may be implemented as well as a virtual machine or appliance, or in any other tangible manner.

While given components of the system have been described separately, one of ordinary skill will appreciate that some of the functions may be combined or shared in given instructions, program sequences, code portions, and the like.

The functionality may be implemented with other application layer protocols besides HTTP/HTTPS, or any other protocol having similar operating characteristics.

There is no limitation on the type of computing entity that may implement the client-side or server-side of any communication. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What is claimed follows below:
1. A method, implemented by a service provider, in association with one or more cloud computing services, comprising:
provisioning, via automation, a plurality of data lakes across the one or more cloud computing services, wherein a data lake is provisioned within a private data cloud of the one or more cloud computing services;
associating a virtual firewall in each of two or more regions of the one or more cloud computing services, wherein the virtual firewall in a given region is associated with a subset of the plurality of data lakes, the subset comprising at least first and second data lakes associated to at least first and second distinct external enterprise networks; and
enforcing security requirements associated with the subset of the plurality of data lakes via the virtual firewall;

wherein the provisioning, associating and enforcing operations are carried out in an automated manner in software executing on hardware.

2. The method as described in claim 1 wherein the cloud computing services are distinct from one another.

3. The method as described in claim 1 wherein regions of the one or more cloud computing services are located in distinct geographic areas.

4. The method as described in claim 1 further including associating a second virtual firewall as a peer to the virtual firewall, the virtual firewall and the second virtual firewall comprising an availability group.

5. The method as described in claim 4 further including failing over from the virtual firewall to the second virtual firewall in an event of a failure associated with the virtual firewall.

6. The method as described in claim 1 wherein all traffic to and from a given data lake passes through the virtual firewall.

7. The method as described in claim 1 wherein enforcing security requirements enforces one of: a security policy ruleset, a network route, a network address translation (NAT) rule, an intrusion detection profile, and a threat detection profile.

8. The method as described in claim 1 wherein the virtual firewall configures access to at least three (3) distinct data lakes.

9. The method as described in claim 1 wherein the virtual firewall configures access to at least ten (10) distinct data lakes.

10. The method as described in claim 1 wherein traffic is end-to-end encrypted between a given external enterprise network, and the given external enterprise network's associated data lake.

11. The method as described in claim 1 wherein the virtual firewall provides an independent ingress gateway and security policy ruleset for a given customer, thereby enabling the given customer to access the data lake associated to the given customer while isolating traffic associated to the given customer from traffic associated to any other customer.

12. A software-as-a-service computing platform, comprising:
   computing hardware;
   computer software executing on the computing hardware, the computer software comprising program code executed on the computing hardware and configured in association with one or more cloud computing services to:

provision, via automation, a plurality of data lakes across the one or more cloud computing services, wherein a data lake is provisioned within a private data cloud of the one or more computing services;

associate a virtual firewall in each of two or more regions of the one or more cloud computing services, wherein the virtual firewall in a given region is associated with a subset of the plurality of data lakes, the subset comprising at least first and second data lakes associated to at least first and second distinct external enterprise networks; and enforce security requirements associated with the subset of the plurality of data lakes via the virtual firewall.

13. The software-as-a-service computing platform as described in claim 12, wherein the program executed on the computing hardware is further configured to associate a second virtual firewall as a peer to the virtual firewall, the virtual firewall and the second virtual firewall comprising an availability group.

14. The software-as-a-service computing platform as described in claim 13, wherein the program executed on the computing hardware is further configured to fail over from the virtual firewall to the second virtual firewall in an event of a failure associated with the virtual firewall.

15. The software-as-as-service computing platform as described in claim 12, wherein all traffic to and from a given data lake passes through the virtual firewall.

16. The software-as-a-service computing platform as described in claim 12, wherein the program code configured to enforce security requirements enforces one of: a security policy ruleset, a network route, a network address translation (NAT) rule, an intrusion detection profile, and a threat detection profile.

17. The software-as-a-service computing platform as described in claim 12, wherein the virtual firewall configures access to at least three (3) or more distinct data lakes.

18. The software-as-a-service computing platform as described in claim 12, wherein the virtual firewall provides an independent ingress gateway and security policy ruleset for a given customer, thereby enabling the given customer to access the data lake associated to the given customer while isolating traffic associated to the given customer from traffic associated to any other customer.

* * * * *